(12) United States Patent  
Bayardo et al.

(10) Patent No.: US 8,190,592 B1  
(45) Date of Patent: May 29, 2012

(54) SIMILARITY-BASED SEARCHING

(75) Inventors: Roberto J. Bayardo, Morgan Hill, CA (US); Yiming Ma, Fremont, CA (US); Ramakrishnan Srikant, Cupertino, CA (US)

(73) Assignee: Google Inc., Mountain View, CA (US)

( * ) Notice: Subject to any disclaimer, the term of this patent is extended or adjusted under 35 U.S.C. 154(b) by 0 days.

(21) Appl. No.: 13/213,768

(22) Filed: Aug. 19, 2011

Related U.S. Application Data

(63) Continuation of application No. 12/059,314, filed on Mar. 31, 2008, now Pat. No. 8,032,507.

(60) Provisional application No. 60/909,390, filed on Mar. 30, 2007.

(51) Int. Cl.  
    *G06F 17/30* (2006.01)

(52) U.S. Cl. ....................................... 707/706

(58) Field of Classification Search .................. 707/2, 3, 707/706  
See application file for complete search history.

(56) References Cited

U.S. PATENT DOCUMENTS

| | | | |
|---|---|---|---|
| 5,933,806 A | 8/1999 | Beyerlein et al. | |
| 6,055,540 A * | 4/2000 | Snow et al. ........................... | 1/1 |
| 2004/0194612 A1 | 10/2004 | Parees | |
| 2005/0234953 A1 | 10/2005 | Zhang et al. | |
| 2008/0005223 A1 | 1/2008 | Flake et al. | |
| 2008/0021860 A1 | 1/2008 | Wiegering et al. | |
| 2008/0031203 A1 | 2/2008 | Bill | |

OTHER PUBLICATIONS

Arasu, A., et al., "Efficient Exact Set-Similarity Joins," VLDB '06 Proceedings of the 32nd International Conference on Very Large Data Bases, Sep. 12-15, 2006, Seoul, Korea, pp. 918-929.
Bayardo, R.J., et al., 'Scaling Up All Pairs Similarity Search,' Proc. of the 16th Int'l Conf. on World Wide Web, WWW 2007, May 8-12, 2007, Banff, Alberta, Canada, pp. 131-140, revised May 21, 2007.
Broder, A.Z., et al., "Syntactic Clustering of the Web," *Proc. of the 6th Int'l World Wide Web Conference*, 1997, pp. 391-303.
Buckley et al., "Optimization of Inverted Vector Searches" Proc. of the Eight Annual Int'l Conf. on Research & Dev. in Information Retrieval, pp. 97-110, 1985, 14 pages.
Charikar, M.S., "Similarity Estimation Techniques from Rounding Algorithms," *Proc. of the 34th Annual Symposium on Theory of Computing*, 2002, pp. 380-388.
Chaudhuri et al., "A Primitive Operator for Similarity Joins in Data Cleaning" Proc. of the 22nd Int'l Conf. on Data Engineering, (to appear), 2006, 12 pages.
Chien, S., and Immorlica, N., "Semantic Similarity Between Search Engine Queries Using Temporal Correlation," *Proc. of the 14th Int'l World Wide Web Conference*, 2005, pp. 2-11.

(Continued)

*Primary Examiner* — Etienne Leroux  
(74) *Attorney, Agent, or Firm* — Fish & Richardson P.C.

(57) ABSTRACT

Pairs of similar objects in a population of objects can be found using a process that includes identifying a comparison vector x in a set of vectors having non-zero features, determining an estimated similarity contribution of a subset of features of the comparison vector x to a similarity between the comparison vector x and each vector in the set of vectors, generating an index that includes features based on a comparison of the similarity contribution with a similarity threshold, and identifying another vector in the set that is similar to the vector x using the index.

21 Claims, 8 Drawing Sheets

OTHER PUBLICATIONS

Fagin, R., et al., "Efficient Similarity Search and Classification via Rank Aggregation," *Proc. of the 2003 ACM-SIGMOID Int'l Conference on Management of Data*, 2003, pp. 301-312.

Gionis, A., "Similarity Search in High Dimensions via Hashing," *Proc. of the 25th Int'l Conference on Very Large Data Bases*, 1999, pp. 518-529.

Indyk, P., and Motwani, R., "Approximate Nearest Neighbors: Towards Removing the Curse of Dimensionality," *Proc. of the 30th Symposium on the Theory of Computing*, 1998, pp. 604-613.

Sarawagi et al., "Efficient set joins on similarity predicates" Proc. of the ACM SIGMOD, pp. 743-754, 2004, 12 pages.

Turtle et al., "Query Evaluation: Strategies and Optimizations" Inform. Process. & Management 31(6):831-850, 1995, 20 pages.

\* cited by examiner

SIMILARITY-BASED SEARCHING

RELATED APPLICATIONS

This application is a continuation of, and claims priority to, U.S. application Ser. No. 12/059,314, filed Mar. 31, 2008 entitled "Similarity-Based Searching," which claims priority to U.S. Provisional Patent Application Ser. No. 60/909,390, filed Mar. 30, 2007, entitled "Similarity-Based Searching," the entirety of which is hereby incorporated by reference.

TECHNICAL FIELD

This disclosure relates to information management.

BACKGROUND

It is useful to search for similar pairs (or groups) of objects from a population of objects. For example, finding similar documents can be useful in document management, such as for removing duplicate documents in a database. The objects to be analyzed can be represented as vectors. Finding similar pairs of objects can involve computing similarity scores between pairs of vectors, and keeping track of which vectors (or which parts of the vectors) have already been compared. The similarity scores can be compared with a threshold, and pairs of vectors whose similarity scores above the threshold are provided as the search result. For example, given a dataset V of vectors, a similarity function $sim(\bullet, \bullet)$, and a threshold value t, one way to identify similar pairs of vectors is to compute $sim(x, y)$ for all pairs of vectors x and y in the dataset V and identify the pairs of vectors x and y for which $sim(x, y) \geq t$.

SUMMARY

In general, in one aspect, a comparison vector x that has non-zero features in a set of vectors is identified; an estimated similarity contribution of a subset of features of the comparison vector x to a similarity between the comparison vector x and each vector in the set of vectors is identified; an index that includes features based on a comparison of the similarity contribution with a similarity threshold is generated; and another vector in the set of vectors that is similar to the vector x using the index is identified.

Implementations may include one or more of the following features. The set of vectors can include dimensions that are ordered such that a number of features occurring in a dimension i varies as a monotonic function of i. The estimated similarity contribution can be based on a similarity between the subset of features and a bounding vector whose ith coordinate equals a largest feature in a dimension i of the set of vectors. The subset of features can be removed from the comparison vector x if the subset of features are included in the index. For each vector v different from the vector x in the set of vectors, the vector v can be identified as a comparison vector, an estimated similarity contribution of a subset of features of the comparison vector v to a similarity between the comparison vector v and each vector in the set of vectors can be determined, and an index that includes features based on a comparison of the similarity contribution with a similarity threshold can be generated.

For each vector v different from the vector x in the set of vectors, after including the subset of the features of the comparison vector v in the index, the index can be used to identify a set of vectors similar to the vector v. In some examples, each vector can represent a corresponding document, in which each feature of each vector can represent a frequency with which a word appears in the document. The vector x can be displayed, and the set of vectors that has been identified as similar to x can be removed. In some examples, each vector can represent a corresponding user in a community, and each feature of each vector can represent a preference of the corresponding user towards an object in a set of objects. After identifying another vector in the set of vectors that is similar to x, an object can be recommended to the user corresponding to the vector x based on the identified similar vector. The set of objects can include a set of musical works or a set of dramatic works.

In some examples, each vector can represent a corresponding user in a community, and each feature of each vector can represent the corresponding user's click-behavior with regard to a content item. After identifying another vector in the set of vectors that is similar to the vector x, vectors that are similar to the vector x can be identified as representing a group of colluding users. The content item can include an advertisement or a web page. Each vector can represent a corresponding query, and each feature of each vector can represent a relevance of a corresponding document to the query. After identifying another vector in the set of vectors that is similar to the vector x, a query corresponding to the identified similar vector can be suggested to a user.

In general, in another aspect, a dataset tool identifies a comparison vector x in a set of vectors, the comparison vector x having non-zero features; a similarity tool determines an estimated similarity contribution of a subset of features of the comparison vector x to a similarity between the comparison vector x and each vector in the set of vectors; an index tool generates an index that includes features based on a comparison of the similarity contribution with a similarity threshold; and a results tool identifies another vector in the set of vectors that is similar to the vector x using the index.

Implementations may include one or more of the following features. The set of vectors can include dimensions that are ordered such that a number of features occurring in a dimension i varies as a monotonic function of i. The estimated similarity contribution can be determined based on a similarity between the subset of features and a bounding vector whose ith coordinate equals a largest feature in a dimension i of the set of vectors. The dataset tool identifies, for each vector v different from the vector x in the set of vectors, v as a comparison vector, and the similarity tool determines, for each vector v different from the vector x in the set of vectors, an estimated similarity contribution of a subset of features of the comparison vector v to a similarity between the comparison vector v and each vector in the set of vectors. The index tool can use the index to identify a set of vectors similar to v.

In some examples, each vector can represent a corresponding document, and each feature of each vector can represent a frequency with which a word appears in the document. The results tool can output the vector x, and the dataset tool can remove from the set of vectors the vectors that have been identified as similar to the vector x. In some examples, each vector can represent a corresponding user in a community, and each feature of each vector can represent a preference of the corresponding user towards an object in a set of objects. The similarity tool can identify another vector in the set of vectors that is similar to the vector x, and the results tool can recommend an object to the user corresponding to the vector x based on the identified similar vector. The set of objects can include a set of musical works or a set of dramatic works. In some examples, each vector can represent a corresponding user in a community, and each feature of each vector can represent the corresponding user's click-behavior with regard to a content item. The similarity tool can identify another vector in the set of vectors that is similar to the vector x, and the results tool can identify vectors that are similar to the vector x as representing a group of colluding users. The content item can include an advertisement or a web page. In some examples, each vector can represent a corresponding query, and each feature of each vector represents a relevance of a corresponding document to the query. The similarity tool can identify another vector in the set of vectors that is similar to the vector x, and the results tool can suggest a query corresponding to the identified similar vector to a user.

In general, in another aspect, a system includes means for identifying a comparison vector x in a set of vectors, the comparison vector x having non-zero features; means for determining an estimated similarity contribution of a subset of features of the comparison vector x to a similarity between the comparison vector x and each vector in the set of vectors; means for generating an index that includes features based on a comparison of the similarity contribution with a similarity threshold; and means for identifying another vector in the set of vectors that is similar to the vector x using the index.

In general, in another aspect, pairs of similar vectors in a set of vectors are identified. A comparison vector x in a set of vectors is identified; a size threshold is determined such that if a similarity between the vector x and a vector y in the set of vectors is equal to or greater than a similarity threshold, then the vector y has a size at least equal to the size threshold, the size of the candidate vector y being determined based on a number of non-zero features in the vector y; and a vector having a size less than the size threshold is removed from the set of candidate vectors.

Implementations may include one or more of the following features. The set of vectors can be ordered according to a maximum weight of each vector, and the set of vectors can be represented as an index. Removing a candidate vector can include removing a vector appearing in an initial position in the index prior to removal. The maximum weight of a vector can be determined based on a largest feature of the vector. The size threshold can be based on a function of the similarity threshold and a maximum weight of the comparison vector x, e.g., the similarity threshold divided by the maximum weight of the comparison vector x. The size threshold can be based on a function of the similarity threshold and a size of the comparison vector x, e.g., the size of the comparison vector x multiplied by the square of the similarity threshold.

After removing the vector having a size less than the minimum size, a candidate vector y in the set is identified; and an estimated similarity between the comparison vector x and the candidate vector y is determined. A similarity between the comparison vector x and the candidate vector y is determined if the estimated similarity meets the similarity threshold; and the pair of vectors (x, y) are identified as a similar pair if the similarity between the comparison vector x and the candidate vector y meets the similarity threshold. For each vector v different from the vector x in the set, the vector v is identified as a comparison vector, and a corresponding set of candidate vectors are identified based on the vector v; and for each vector v different from the vector x in the set whose corresponding set of candidate vectors is not empty, a subset of candidate vectors that are similar to v are identified based on a similarity between vectors in the subset and v. The pair of similar vectors (x, y) can be outputted.

Each vector can represent a corresponding document, and each feature of each vector can represent a frequency with which a word appears in the document. Each vector can represent a corresponding user in a community, and each feature of each vector can represent a preference of the corresponding user towards an object in a set of objects. An object can be recommended to a user corresponding to the vector x based on the vector y. The set of objects can include a set of musical works or a set of dramatic works. Each vector can represent a corresponding user in a community, and each feature of each vector can represent the corresponding user's click-behavior with regard to a content item. A pair of vectors (x, y) can be identified as representing a group of colluding users that correspond to the vectors x and y. The content item can include an advertisement or a web page. Each vector can represent a corresponding query, and each feature of each vector can represent a relevance of a corresponding document to the query. A query corresponding to the vector y can be suggested to a user.

In general, in another aspect, a dataset tool identifies a set of candidate vectors in a set of vectors, each candidate vector having features, and identifies a comparison vector x in the set of vectors; and a similarity tool determines a size threshold such that if a similarity between one of the candidate vectors y and the comparison vector x is equal to or greater than a similarity threshold, then the vector y has a size at least equal to the size threshold. The dataset tool removes a vector having a size less than the size threshold from the set of vectors.

Implementations may include one or more of the following features. In some examples, the similarity tool can determine the size threshold based on a function of the similarity threshold and a maximum weight of the comparison vector x, e.g., the similarity threshold divided by the maximum weight of the comparison vector x. In some examples, the similarity tool can determine the size threshold based on a function of the similarity threshold and a size of the comparison vector x, e.g., the size of the comparison vector x multiplied by the square of the similarity threshold.

The results tool can identify a candidate vector y in the set after removing the vector having a size less than the size threshold, and the similarity tool can identify an estimated similarity between the comparison vector x and the candidate vector y. The similarity tool can determine a similarity between the comparison vector x and the candidate vector y if the estimated similarity meets the similarity threshold. A results tool can identify vectors (x, y) as a similar pair if the similarity between the comparison vector x and the candidate vector y meets the similarity threshold. In some examples, each vector can represent a corresponding document, and each feature of each vector can represent a frequency with which a word appears in the document. In some examples, each vector can represent a corresponding user in a community, and each feature of each vector can represent a preference of the corresponding user towards an object in a set of objects. In some examples, each vector can represent a corresponding user in a community, and each feature of each vector can represent the corresponding user's click-behavior with regard to a content item. In some examples, each vector can represent a corresponding query, and each feature of each vector can represent a relevance of a corresponding document to the query.

In general, in another aspect, pairs of similar vectors in a set of vectors are identified. A comparison vector x is identified, and a set of candidate vectors corresponding to the vector x is identified. For each candidate vector y in the set, a similarity estimate between the comparison vector x and the candidate vector y is determined; if the similarity estimate meets a similarity threshold, a similarity score of the comparison vector x and the candidate vector y is determined; and if the similarity score meets the similarity threshold, the pair of vectors (x, y) is included in a list of similar pairs of vectors.

Implementations may include one or more of the following features. The similarity estimate can be determined based on a predetermined function such that the similarity estimate is greater than or equal to the similarity score between the comparison vector x and the candidate vector y. The similarity estimate can be based on a sum of (i) a similarity between a set of processed features of the comparison vector x and a set of processed features of the candidate vector y, and (ii) a product of a minimum size of at least one of the candidate vector x or a set of non-processed features of the candidate vector y, and a similarity score between a maximum weight of the comparison vector x and a maximum weight of the candidate vector y. For each vector v different from x in a set of vectors, the vector v can be identified as a comparison vector, and a set of candidate vectors corresponding to v can be identified. For each candidate vector w in the set, a similarity estimate between the comparison vector v and the candidate vector w can be determined. If the similarity estimate meets the similarity threshold, a similarity score of the comparison vector v and the candidate vector w can be determined. If the similarity score meets the similarity threshold, the pair of vectors (v, w) can be included in the list of similar pairs of vectors.

In general, in another aspect, pairs of similar vectors in a set of vectors are identified. A pair of similar vectors (x, y) in a set of vectors are identified based on a similarity threshold and an accumulation of partial similarity scores each representing a similarity between features of the vector x and other vectors in the set. An upper bound of a sum of partial similarity scores of non-processed features of the vector x and non-processed features of the other vectors is determined, the non-processed features being features that have not been used to calculate the partial similarity scores. The number of partial similarity scores that need to be computed is reduced by not calculating partial similarity scores for some vectors when the upper bound meets a predetermined criterion.

Implementations may include one or more of the following features. The upper bound can meet the predetermined criterion when the upper bound is less than the similarity threshold. The upper bound can be updated over time by, after processing each feature $x_i$ of the vector x, reducing the upper bound based on a similarity between the feature $x_i$ and a maximum corresponding feature among the other vectors. Identifying the pair of similar vectors (x, y) can include iteratively processing features of the comparison vector x, adding some of the vectors having features that have been processed to a set of candidate vectors, and stop adding new vectors to the set of candidate vectors when the upper bound meets the predetermined criterion. After stop adding new vectors to the set of candidate vectors, partial similarity scores between features of the vector x and corresponding features of vectors already in the set of candidate vectors can continue to be accumulated. A similarity estimate between the comparison vector x and a candidate vector y can be determined; if the similarity estimate meets a similarity threshold, a similarity score of the comparison vector x and the candidate vector y can be determined; and if the similarity score meets the similarity threshold, the pair of vectors (x, y) can be identified as a pair of similar vectors. A vector y in the set of candidate vectors can be identified such that a similarity between the vector y and the comparison vector x meets the similarity threshold.

In general, in another aspect, pairs of similar vectors in a set of vectors are identified. A similarity threshold is identified; one or more features of vectors are processed according to a predetermined process; a comparison vector x having processed features and non-processed features is identified, in which the processed features have been processed by the predetermined process and the non-processed features have not been processed by the predetermined process. Based on the comparison vector x, a first set of vectors is identified, each vector having corresponding processed features and corresponding non-processed features. A candidate vector y is identified from the first set of vectors; a maximum similarity between the non-processed features of x and the non-processed features of y is determined; and the vector y is removed from the first set of vectors if the maximum similarity does not meet the similarity threshold.

Implementations may include one or more of the following features. Processing one or more features of vectors according to the predetermined process can include determining a similarity of two features. Processing one or more features of vectors according to the predetermined process can include incrementing an accumulated similarity score according to the similarity of the features. A subset of vectors can be removed from the first set based on the maximum similarity between the non-processed features of x and the non-processed features of each vector in the first set. A similarity between the comparison vector x and the candidate vector y can be determined, and the pair of vectors (x, y) can be included in a set of similar pairs of vectors if the similarity between the vectors x and y meets the similarity threshold.

For each vector v different from x in a second set of vectors, in which each vector v has processed features and non-processed features, the vector v can be identified as a comparison vector; based on the comparison vector v, a set of vectors corresponding to v can be identified, each vector having corresponding processed features and corresponding non-processed features; a candidate vector $y_v$ can be identified from the set of vectors corresponding to v; and based on a maximum similarity between the non-processed features of v and the non-processed features of $y_v$, the vector $y_v$ is removed from the set of vectors corresponding to v. The maximum similarity between the non-processed features of x and the non-processed features of y can be determined based on a similarity between the non-processed features of x and a bounding vector having an ith coordinate equal to a largest feature in an ith coordinate among all vectors in a second set of vectors.

In some examples, each vector can represent a corresponding document, and each feature of each vector can represent a frequency with which a word appears in the document. The vector x can be displayed. In some examples, each vector can represent a corresponding user in a community, and each feature of each vector can represent a preference of the corresponding user towards an object in a set of objects. An object can be recommended to a user corresponding to the vector x based on the vector y. The set of objects can include a set of musical works or a set of dramatic works. In some examples, each vector can represent a corresponding user in a community, and each feature of each vector can represent the corresponding user's click-behavior with regard to a content item. A pair of vectors (x, y) can be identified as representing a group of colluding users. The content item can include at least one of an advertisement or a web page. Each vector can represent a corresponding query, and each feature of each vector can represent a relevance of a corresponding document to the query. A query corresponding to the vector y can be suggested to a user.

In general, in another aspect, a dataset tool identifies a comparison vector x, and a set of candidate vectors corresponding to the vector x. A similarity tool determines a similarity estimate between the comparison vector x and each candidate vector y in the set, and identifies a similarity score between the comparison vector x and each candidate vector y if the similarity estimate meets a similarity threshold. A results tool includes the pair of vectors (x, y) for each candidate vector y in a list of similar pairs of vectors if the similarity score meets the similarity threshold.

Implementations may include one or more of the following features. The similarity tool can determine the similarity estimate of the comparison vector x and the candidate vector y based on a predetermined function such that the similarity estimate is greater than or equal to a similarity score of the comparison vector x and the candidate vector y. The similarity tool can determine the similarity estimate based on a sum of (i) a similarity between a set of processed features of the comparison vector x and a set of processed features of the candidate vector y, and (ii) a product of a minimum size of at least one of the candidate vector x or a set of non-processed features of the candidate vector y, and a similarity score of a maximum weight of the comparison vector x and a maximum weight of the candidate vector y. The dataset tool can identify each vector v different from x in a set of vectors as a comparison vector, and identify a set of candidate vectors corresponding to each vector v. The similarity tool can determine, for each candidate vector w, a similarity estimate between the comparison vector v and the candidate vector w. The similarity tool can determine a similarity score of the comparison vector v and the candidate vector w if the similarity estimate meets the similarity threshold. The results tool can include the pair of vectors (v, w) in the list of similar pairs of vectors if the similarity score meets the similarity threshold.

In general, in another aspect, a dataset tool identifies a comparison vector x having processed features and non-processed features, based on the comparison vector x, a first set of vectors, each vector having corresponding processed features and corresponding non-processed features, and a candidate vector y from the first set of vectors. A similarity tool determines a similarity threshold, and a maximum similarity between the non-processed features of x and the non-processed features of y. The dataset tool removes the vector y from the first set of vectors if the maximum similarity does not meet the similarity threshold.

Implementations may include one or more of the following features. The dataset tool can remove a subset of vectors from the first set of vectors based on the maximum similarity between the non-processed features of the vector x and the non-processed features of each vector in the first set. The similarity tool can determine a similarity between the comparison vector x and the candidate vector y. A results tool can include the vectors (x, y) in a set of similar pairs of vectors if the similarity between the vectors x and y meets the similarity threshold.

Each vector v different from x can have processed features and non-processed features, in which the dataset tool can identify each vector v different from x as a comparison vector. The dataset tool can identify a set of vectors corresponding to v based on the comparison vector v, each vector in the set of vectors corresponding to v having corresponding processed features and corresponding non-processed features. The dataset tool can identify a candidate vector $y_v$ from the set of vectors corresponding to v. The dataset tool can remove the vector $y_v$ from the set of vectors corresponding to v if a maximum similarity between the non-processed features of v and the non-processed features of $y_v$ does not meet the similarity threshold. The maximum similarity between the non-processed features of x and the non-processed features of y can be determined based on a similarity between the non-processed features of x and a bounding vector having an ith coordinate equal to a largest feature in an ith coordinate among all vectors in a second set of vectors.

In some examples, each vector can represent a corresponding document, and each feature of each vector can represent a frequency with which a word appears in the document. In some examples, each vector can represent a corresponding user in a community, and each feature of each vector can represents a preference of the corresponding user towards an object in a set of objects. A results tool recommends an object to a user corresponding to the vector x based on the vector y. The set of objects can include a set of musical works or a set of dramatic works. In some examples, each vector can represent a corresponding user in a community, and each feature of each vector can represents the corresponding user's click-behavior with regard to a content item. The content item can include an advertisement or a web page. In some examples, each vector can represents a corresponding query, and each feature of each vector can represents a relevance of a corresponding document to the query. A results tool can suggest a query corresponding to the vector y to a user.

Other aspects include other combinations of the features recited above and other features, expressed as methods, apparatus, systems, program products, and in other ways.

Advantages of the aspects and implementations may include one or more of the following. All similar pairs (x, y) of objects can be identified from a population of objects. In order to facilitate the comparison, an index is created that is relatively small, but enough features of each vector are indexed so that vectors that are similar to a given vector x are identified as candidate vectors for x by using the index. In deciding whether to index a particular feature, or in deciding whether two vectors are similar, using similarity estimates (instead of exact similarity scores) can provide enough information to decide whether to index, or whether two vectors are similar. Using similarity estimates instead of exact similarity scores can increase the performance of indexing and finding matches. Other features and advantages will be apparent from the description and from the claims.

DESCRIPTION OF DRAWINGS

Like reference symbols in the various drawings indicate like elements.

DETAILED DESCRIPTION

Overview

In some examples, finding all pairs of similar objects in a population of objects includes using an inverted index to keep track of the objects (or portions of objects) that have been examined. In some examples, the inverted index is built by including only items that satisfy certain criteria, thus increasing the speed of computation and reducing the amount of data that needs to be stored. In some examples, the computation can be made more efficient by using estimates on similarity to determine whether pairs of objects are sufficiently similar without computing an exact similarity score between the objects.

In the description below, definitions of terms will be provided, followed by examples of datasets and examples of ways to find pairs of similar items in the datasets.

DEFINITIONS

The following are definitions used in this description.

"V": The symbol V denotes a dataset that can, by way of example, be represented as a set of n vectors, each vector having m dimensions. For example, the dataset can be written as $V=\{v^1, \ldots, v^n\}$ in which each of $v^1, \ldots, v^n$ is a vector. Each vector can represent an object, so finding pairs of similar objects involves finding pairs of similar vectors.

When referring to a list of vectors, a superscript is used to differentiate vectors in the list, but does not necessarily indicate a vector's position in the list. For example, a dataset $V=\{v^1, \ldots, v^{100}\}$ contains 100 vectors, but the vector $v^1$ is not necessarily the first vector in the dataset.

Figure 1A:
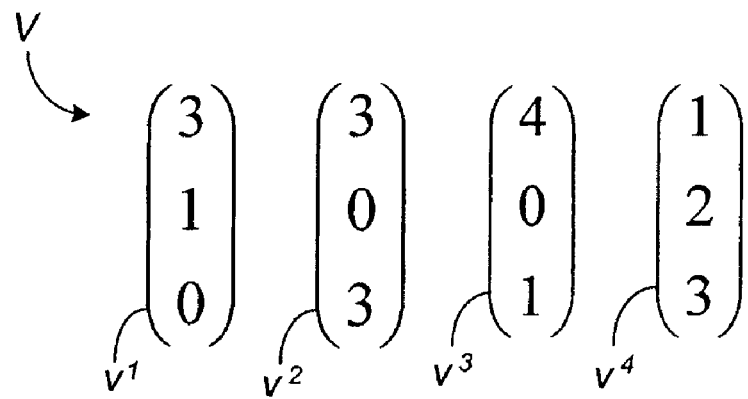
FIG. 1A is an example set of vectors.

FIG. 1A is an example set V of vectors, which includes vectors $v^1=(3, 1, 0)$, $v^2=(3, 0, 3)$, $v^3=(4, 0, 1)$, and $v^4=(1, 2, 3)$.

"Feature": If x is a vector in V, a "feature" of x refers to a non-zero component of the vector x. For example, the vector $x=(10, 2, 0, 0, 0, 0, 0, 10)$ has three features. If dimensions are numbered in an increasing left-to-right order starting at 1, then the vector x has features in dimensions 1, 2, and 8.

"Size": The size of a vector x, denoted $|x|$, is defined as the number of features of x. For example, the vector $x=(10, 2, 0, 0, 0, 0, 0, 10)$ has a size $|x|=3$.

"Norm": A "norm," of x, denoted $\|x\|$, is a non-negative real number that satisfies:

$$\|x+y\| \leq \|x\|+\|y\|, \quad (1)$$

$$\|ax\| = |a| \cdot \|x\|, \text{ and} \quad (2)$$

$$\|x\|=0 \text{ if and only if } x=0 \quad (3)$$

for all vectors x, y and all scalars a. When a is a scalar, the notation $|a|$ denotes the absolute value of a. One example of a norm is the Euclidean norm, defined by $$\|x\| = \sqrt{\sum_{i=1}^{n} x_i^2}.$$

Note that in many examples the size of a vector is not a norm. For example, if x is a vector and a is a scalar, then $|ax|=|x|$. Thus, the size of a vector does not satisfy property (2) above.

"maxweight(•)", "$\max_i(\cdot)$": If x is a vector, then the largest feature of x is denoted maxweight(x). For example, if $x=(1, 2, 3, 4, 100, 2, 0)$, then maxweight(x)=100. If a dataset V is an m-dimensional dataset, then the largest feature occurring among the vectors in the dataset V in dimension i is denoted $\max_i(V)$. For example, if $V=\{(2, 1), (1,3)\}$, then $\max_1(V)=2$ and $\max_2(V)=3$.

"Bounding vector": Given a dataset V, a "bounding vector," denoted bound(V), is the vector whose ith coordinate equals $\max_i(V)$. Thus, the bounding vector for the dataset $V=\{(2, 1), (1,3)\}$ is given by bound(V)=(2, 3). Note that bound(V) need not be among the vectors in V.

"Similarity function, sim(•, •)": Given a dataset V, a measure of similarity among the vectors in V can be represented by a similarity function sim: $V \times V \rightarrow X$, where X is an ordered set, and sim(x,y)=sim(y, x) for all vectors x, y in V. The similarity function provides a measure of similarity between pairs of vectors, such that in one implementation if sim(x,y) is greater than sim(a,b), then the vectors x and y are "closer" or "more similar" to each other than the vectors a and b are to each other. The similarity function can have values that are, e.g., real numbers.

Examples of similarity functions include the dot product of vectors:

$$\text{dot}(x, y) = x \cdot y = \sum_{i=1}^{n} x_i y_i,$$

and the cosine-similarity of vectors, defined by $\cos(x, y)=\text{dot}(x,y)/(\|x\|\cdot\|y\|)$. Note that use of term cosine-similarity does not imply that the dataset V or its constituent vectors have an underlying geometric structure, or that there is necessarily an angle between two vectors. Other examples of similarity functions include the following:

$$sim_1(x, y) = \frac{\text{dot}(x, y)}{\sqrt{|x| \cdot |y|}};$$

$$sim_2(x, y) = \frac{\text{dot}(x, y)}{\min(|x|, |y|)};$$

$$sim_3(x, y) = \frac{2 \cdot \text{dot}(x, y)}{|x| + |y|};$$

$$sim_4(x, y) = \frac{\text{dot}(x, y)}{|x| + |y| - \text{dot}(x, y)}.$$

Similarity functions may be derived from the above formulas, for example, by replacing any instance of |•| with ‖•‖.

"Similar": Given a dataset V, a similarity function sim(•, •) is useful in identifying all pairs of vectors in the dataset V having a degree of similarity equal to or greater than a specified similarity threshold. For example, the similarity function can be used to find all pairs x and y such that sim(x,y)≧t, for a specified threshold t. In the description below, referring to vectors x and y as "similar" means that the vectors x and y have a degree of similarity above a specified similarity threshold for a given similarity function.

The term "similarity" does not necessarily imply a transitive relation among vectors. For example, if a vector x is similar to a vector y and y is similar to a vector z, then x can be, but need not be, similar to z. The term "similarity" also does not necessarily imply a reflexive relation among vectors: a vector x need not be similar to itself. For example, using the dot product as a similarity function, a vector having only one feature $x_1$ is not self-similar for a similarity threshold t greater than $(x_1)^2$.

For some similarity functions, a dataset V can be normalized such that each nonzero vector is self-similar for a range of similarity thresholds. For example, using the dot product as a similarity function, if a dataset V is normalized so that its constituent vectors $v^i$ each satisfy $\|v^i\|=1$ (in the Euclidean norm), then each vector is self-similar for similarity thresholds less than or equal to 1.

"Inverted Index": One may represent all or part of V as an inverted index I. An inverted index I is a collection of lists $I_1, \ldots, I_m$, where each list $I_i$ is a set of vector-feature pairs (x, $x_i$) such that x is a vector in V and $x_i$ is a feature of x. In other words, the list $I_i$ is a collection of features, together with their associated vectors, that occur in the i-th dimension of the vectors in V. The term $I_i$ represents the i-th dimension of the inverted index I, and is sometimes referred to as the inverted index $I_i$.

Figure 1B:
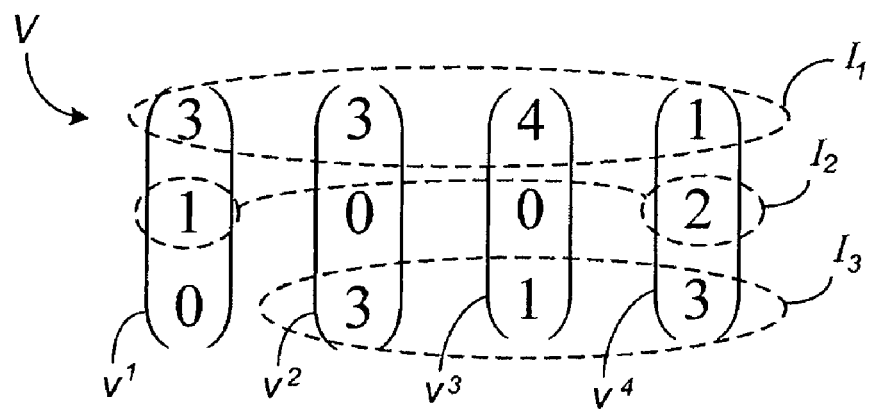
FIGS. 1B and 1C are schematic illustrations of example inverted indices.

An example of an inverted index representation I=($I_1$, $I_2$, $I_3$) of the dataset V of FIG. 1B:

$I_1 = \{(v^1,3),(v^2,3),(v^3,4),(v^4,1)\}$ $I_2 = \{(v^1,1),(v^4,2)\}$ $I_3 = \{(v^2,3),(v^3,1),(v^4,3)\}.$

In this example, the inverted index has three dimensions.

FIG. 1B is a diagram showing a relationship between the dataset V and the inverted index I=($I_1$, $I_2$, $I_3$). Each feature of V is contained within a dashed line $I_1$, $I_2$, or $I_3$. A feature enclosed by a dashed line $I_1$ is contained in the inverted index $I_1$, a feature enclosed by a dashed line $I_2$ is contained in the inverted index $I_2$, and a feature enclosed by a dashed line $I_3$ is contained in the inverted index $I_3$.

An inverted index of a dataset V can, e.g., include a portion (less than all) of the features of V. For example, the dataset V of FIG. 1B can be represented by the inverted index I=($I_1$, $I_2$, $I_3$):

$I_1 = \{(v^2,3),(v^3,4),(v^4,1)\}$ $I_2 = \{(v^4,2)\}$ $I_3 = \{ \}.$

Figure 1C:
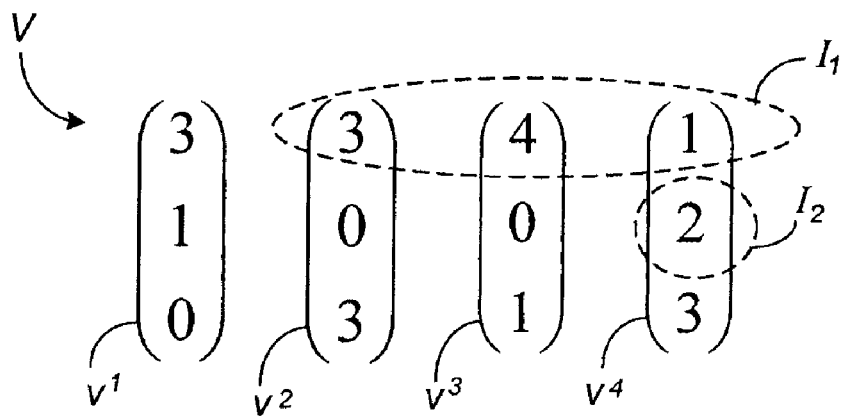

FIG. 1C is a schematic illustration of this example inverted index I=($I_1$, $I_2$, $I_3$).

In some examples, as described below, an inverted index I may be built from a dataset V in a feature-by-feature or vector-by-vector manner. For example, the inverted index I may be built by iterating feature-by-feature or vector-by-vector through one or more logical loops. The term "inverted index" describes I at each iteration even though in some implementations some vector-feature pairs (x, $x_i$) do not appear in the inverted index I after a particular iteration. Adding a feature to the inverted index is referred to as "indexing" the feature.

Examples of Datasets

In some examples, a dataset V represents a collection of strings of text, e.g., documents such as HTML pages or plain text files. Other forms of data are possible. In this example, each vector represents a string of text, e.g., a document. In one implementation, each dimension in the dataset V corresponds to a word, and coordinates of a vector correspond to the frequency of the corresponding word in a string of text. For example, the first dimension may correspond to the word "apple," and the second dimension may correspond to the word "ball." A vector having (2, 4) as the first and second coordinates indicates that the document has two occurrences of "apple" and four occurrences of "ball." Similar pairs or clusters of similar documents may contain similar information. Accordingly, and by way of example, after identifying all pairs or clusters of similar documents, one document in each pair or cluster can be displayed or used, while other similar document(s) in the pair or cluster is/are suppressed or deleted.

In some examples, a dataset V can include vectors in which each vector is associated with a particular query, different vectors corresponding to different queries. In this example, each dimension of the dataset V corresponds to a document, and each coordinate of a vector represents the relevance of a corresponding document to a particular query. Thus, the dataset V may represent a collection of queries, and identifying similar pairs of vectors can be used to identify similar pairs of queries. In one implementation, upon receiving a query Q from a user, other queries similar to the query Q are identified and suggested to the user as alternative queries.

In some examples, the dataset V may include vectors each describing a person's preferences for certain items (e.g., musical works, dramatic works, movies, artists, web pages, etc.) For example, each dimension of the dataset V may correspond to one of the items, and each coordinate of a vector may represent the user's preference for the corresponding item. In this example, similar vectors correspond to users having similar preferences for the items, and identifying pairs (or clusters) of similar vectors may be used in identifying pairs (or clusters) of users with similar preferences.

Similar vectors correspond to users having similar preferences for the items, and identifying pairs (or clusters) of similar vectors may be used in identifying pairs (or clusters) of users with similar preferences. In some implementations, for example, when the dimensions of the dataset correspond to musical works, identifying pairs of similar users can be used to recommend a particular song to a user, based on another, similar user's preference towards the song. In another example, when the dimensions of the dataset correspond to musical works, identifying pairs of similar users can be used to introduce a friend of a first user to a second user, based on a similarity (e.g., overlap) between the friends of the first and second users.

In some examples, the set V may include vectors each describing a user's click-behavior with regard to certain advertisements or web pages. For example, each dimension of the dataset V may correspondence to a particular advertisement (or web page), different dimensions corresponding to different advertisements (or web pages). In this example, each coordinate of a vector may represent how often a user has clicked on the corresponding advertisement (or web page). In this example, identifying pairs (or clusters) of similar vectors may be used to identify pairs (or clusters) of users with similar click-behavior. Identifying a cluster of users that behave similarly may be useful in, e.g., identifying users that collude to commit fraudulent activities.

The following describes systems and processes for identifying all pairs of vectors in V with similarity scores above a specified threshold.

Search Systems

Figure 2:
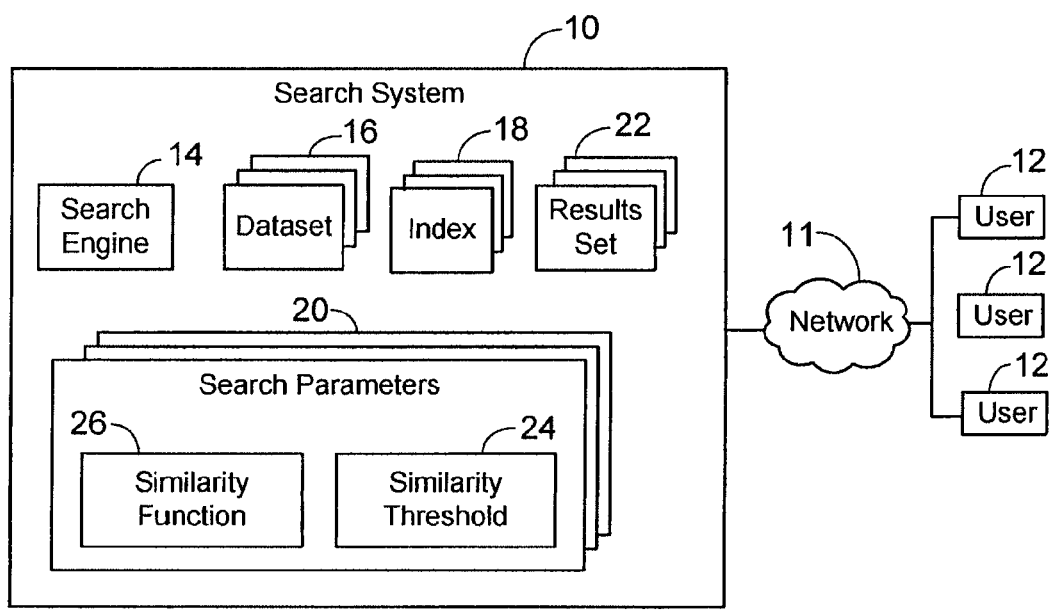
FIG. 2 is a schematic representation of a search system.

FIG. 2 is a schematic representation of an example of a search system 10. The system 10 is in data communication with one or more (e.g., several) users 12 through, for example, a wired or wireless network 11. The user 12 can be, e.g., a human user or a non-human user, such as a computer program. The search system 10 includes a search engine 14, one or more (e.g., several) datasets 16, one or more (e.g., several) indices 18, one or more (e.g., several) sets of search parameters 20, and one or more (e.g. several) results sets 22, each result set 22 listing all the similar pairs from a particular dataset 16.

Each dataset 16 may correspond to one or more (e.g., several) indices 18. The search system 10 can associate one or more (e.g., several) datasets 16 or one or more (e.g., several) sets of search parameters 20 with one or more (e.g., several) users 12. Each user 12 can establish a user profile with the search system 10 to define the user's preferences with regard to the parameters 20.

The search parameters 20 include a similarity threshold 24 and a similarity function 26. The similarity threshold 24 or the similarity function 26 can be provided by the user 12, or provided by another source (e.g., a preset similarity threshold 24 or a preset similarity function 26 provided with the search system 10). The similarity threshold 24 includes a condition under which two vectors in a dataset 16 are considered similar. In some examples, the condition includes a numerical value, in which similar pairs of vectors are defined as pairs whose similarity score is greater than or equal to the numerical threshold. In some examples, the similarity function 26 includes a formula that can associate a similarity score with a pair of vectors.

Figure 3:
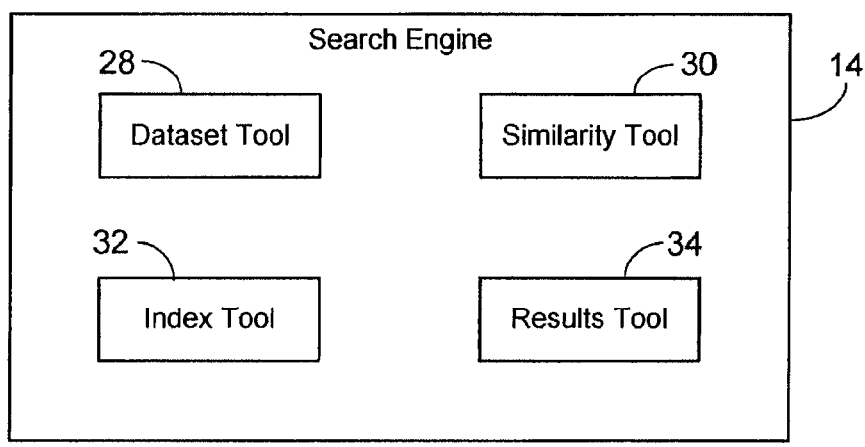
FIG. 3 is a schematic depiction of an example search engine.

FIG. 3 is a schematic depiction of an example search engine 14. The example search engine 14 includes a dataset tool 28, a similarity tool 30, an index tool 32, and a results tool 34. Each of the tools 28, 30, 32, and 34 can be implemented in, for example, hardware, software, or a combination thereof.

The dataset tool 28 is operable to read from or write to the dataset 16. In some implementations, the dataset tool 28 can sort the dataset 16 according to one or more sort criteria, identify particular features in the dataset 16 (e.g., a largest feature in a particular dimension or the largest feature in a particular vector), or remove features from a vector. For example, if a feature of a vector is written in the inverted index 18, then the dataset tool 28 can remove a corresponding feature of a corresponding vector in the dataset 16.

The similarity tool 30 is operable to determine or estimate a similarity score between two pairs of vectors in the dataset 16. For example, the similarity tool 30 may invoke the similarity function 26 to determine the similarity score between two vectors. Moreover, the similarity tool 30 may accumulate partial similarity scores between portions of vectors. For example, the similarity tool 30 may accumulate partial similarity scores by iteratively defining a function or a table describing a similarity score between vectors on each iteration.

The index tool 32 is operable to read from or write to the inverted index 18. In some implementations, the index tool 32 writes vectors or features of vectors to the index 18 based on data provided by the dataset tool 28 or the similarity tool 30. For example, based on an estimated similarity score between two vectors, the index tool 32 may index a particular feature of a particular vector provided by the dataset tool 28.

The results tool 34 is operable to read from or write to the results set 22. In some implementations, the results tool 34 writes vectors or features to the results set 22 based on data provided by the dataset tool 28, the similarity tool 30, or the index tool 32. For example, based on a similarity score provided by the similarity tool 30, the results tool 34 may write a pair of vectors provided from the index tool 32 or the dataset tool 28 to the results set 22. In another example, the results tool 34 may provide information read from the results set 22 to the user 12 in response to a request from the user 12.

Figure 4:
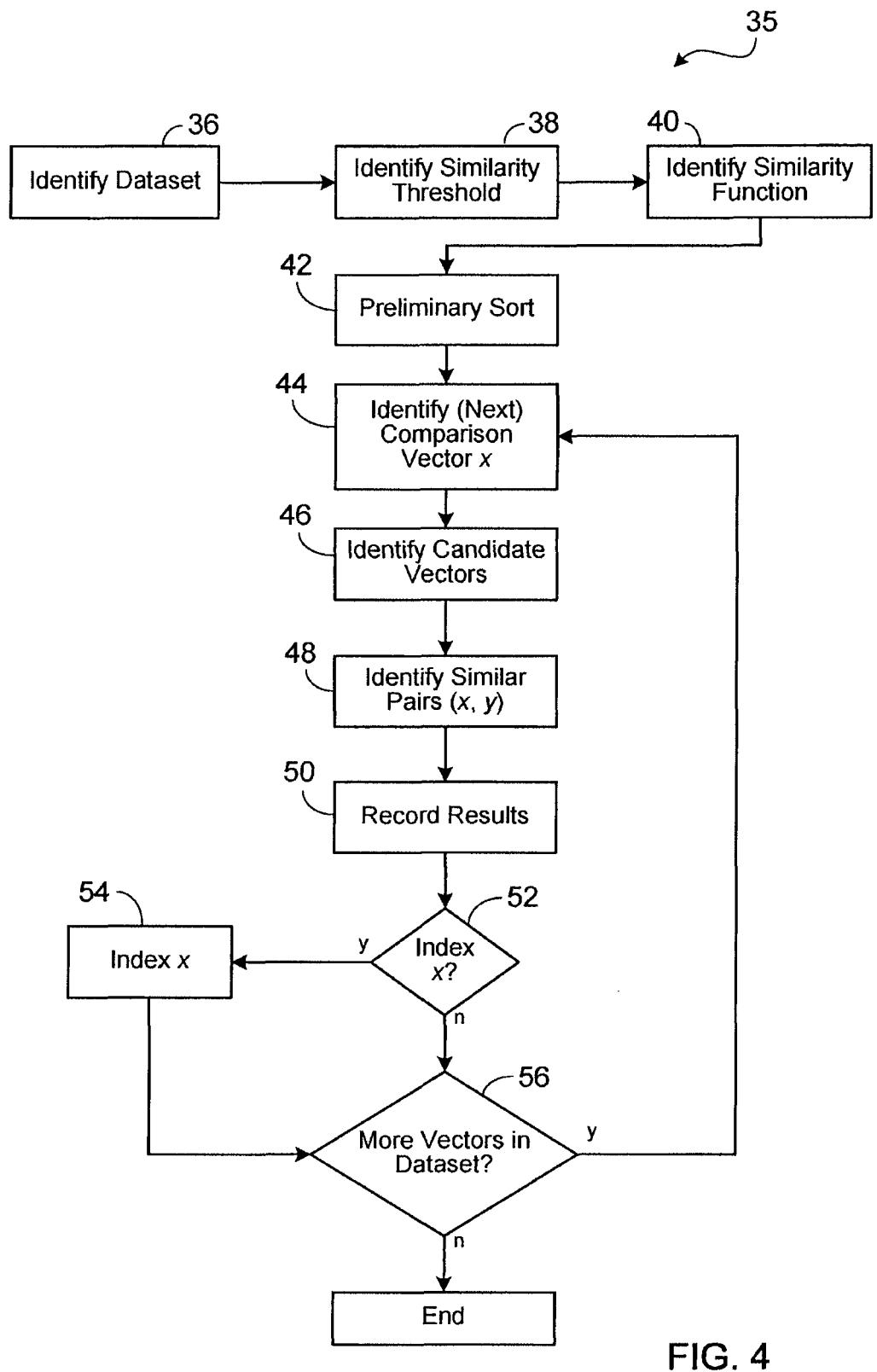
FIG. 4 is a flowchart for an example process for searching and indexing a dataset.

FIG. 4 is a flowchart of an example of a general process 35 for identifying similar pairs in a dataset in which the dataset is partially indexed. In step 36, a dataset V is identified. In some implementations, the dataset V can include one or more (e.g., several) vectors, one or more (e.g., several) functions with finite domains, one or more (e.g., several) arrays, etc. For example, the dataset V may be a dataset 16 in the search system 10. In the following example, the dataset V is described as having a collection of vectors, but the searching methods can also be extended to other types of data sets mutatis mutandis. For example, the dataset V can include an array (e.g., each column in the array being treated as a vector), or a set of functions (e.g., a function $f$ can be considered a vector whose i-th component equals $f(i)$). In some implementations, the dataset V is identified by the dataset tool 28.

In step 38, a similarity threshold t is identified. For example, t may be a similarity threshold 24 in the search system 10. In some implementations, the similarity threshold t is identified by the similarity tool 30.

In step 40, a similarity function sim(•, •) is identified. For example, sim(•, •) may be a similarity function 26 in the search system 10. In some implementations, the similarity function is identified by the similarity tool 30.

The dataset 16 is preliminarily sorted according to one or more criteria (step 42). In some implementations, the preliminary sorting can include sorting dimensions in the dataset V, or vectors in the dataset V. For example, the preliminary sorting can allow certain estimates of similarity to be computed based in part on an order of dimensions or vectors. In some implementations, the preliminary sorting can be performed by the dataset tool 28. The sorting will be described below.

In step 44, a vector x is identified. In some implementations, the vector x is identified based on the preliminary sort. For example, if the vectors in the dataset V were ordered according to certain criteria, then the vector x and subsequent vectors can be identified in an order consistent with the order in the dataset V. In some implementations, the vector x is identified by the dataset tool 28.

During one iteration of the steps 44 to 56, the vector x identified in step 44 is referred to as a "comparison vector," which is used for comparing to other vectors. In a subsequent iteration of steps 44 to 56, a different vector y may be identified in step 44. In the subsequent iteration, y (and not x) is referred to as a comparison vector.

After identifying the vector x, other vectors that may be similar to the vector x are identified (step 46). For example, an identified vector y is referred to as a "candidate vector," indicating that it is a candidate as a member in the potentially similar pair (x, y). In a subsequent iteration of the steps 44 to 56, a different vector z in the dataset V may be identified in step 46. In the subsequent iteration, the vector z (and not y) is considered a candidate vector. Note that a vector that was identified as a candidate vector in one iteration of the loop 44 to 56 may serve as a comparison vector in a different iteration of the loop.

In some implementations, a vector y is identified as a candidate vector based on an estimated similarity between x and y. For example, the similarity tool 30 may determine an estimated similarity between vectors x and y, and if the estimated similarity meets the similarity threshold 24, then the vector y is identified as a candidate vector. Determining the estimated similarity may involve less computation than determining an exact similarity score, and can be useful in quickly eliminating vectors that are unlikely to be candidate vectors. In some implementations, there need not be any candidate vectors identified.

Similarity scores are determined between the comparison vector x and any of the candidate vectors y (step 48). In some implementations, the similarity scores are determined by the similarity tool 30. For example, the similarity score may be determined by invoking the similarity function 26, or by accumulating partial similarity scores in, for example, a table or a function. If the similarity score between the comparison vector x and a candidate vector y meets the similarity threshold 24, then the pair of vectors (x, y) is identified as a similar pair in step 48. In some implementations, the results tool 34 records the vectors (x, y) as a similar pair in the results set 22 (step 50).

After identifying similar pairs, what features (if any) of the comparison vector x to index is determined (decision 52). In some implementations, the index tool 32 determines whether to index a particular feature of the comparison vector x. For example, a feature may be indexed based on an estimated similarity contribution of the feature to similarity scores among other vectors in the dataset V. Indexing features of the comparison vector x on the basis of an estimated similarity contribution between x and other vectors in the dataset allows the index to remain relatively small, while simultaneously indexing enough features of each vector so that similar vectors are identified as candidate vectors. The features of the comparison vector x to be indexed are written to the index (step 54). In some implementations, the index tool 32 writes the features to the index 18.

If there are other vectors in the dataset V that have not yet been identified in step 44, then the loop 44 to 56 is repeated using these vectors. In some implementations, the dataset tool 28 determines whether there are any such vectors. After repeating the loop 44 to 56 until every vector in the dataset has been identified, each pair of similar vectors (x, y) is recorded in step 50.

Figure 5:
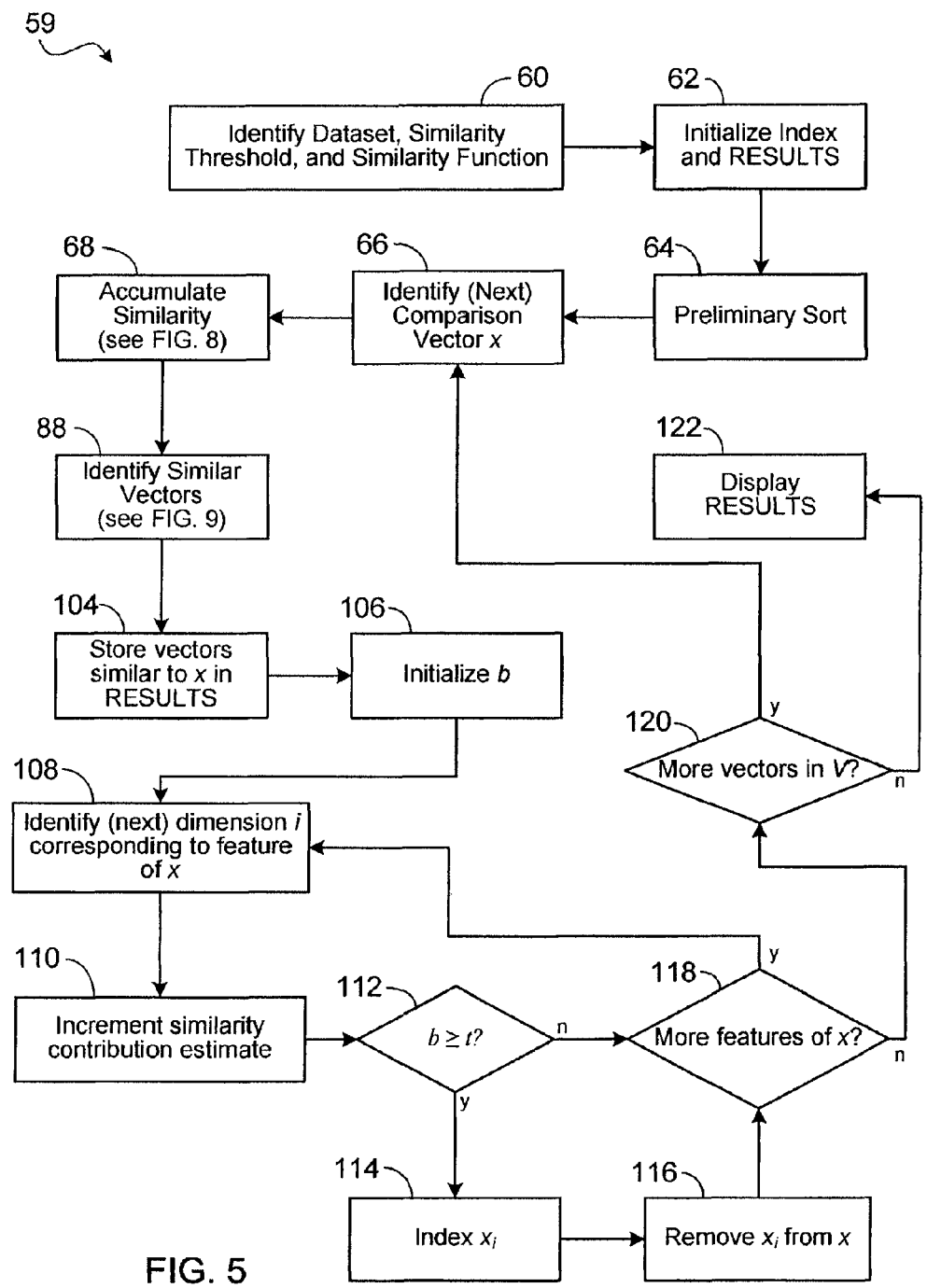
FIG. 5 is a flowchart for an example search and index processes.

FIG. 5 is a flowchart of an example of a process 59 for identifying similar pairs of vectors in a dataset. The process 59 is based on the general process 35 of FIG. 4. A dataset V, a similarity threshold t, and a similarity function sim(•, •) are identified (step 60). In some implementations, the similar pairs are written to a "results file," which can be an electronic file or any type of data structure such as a set, a list, a string, etc. In some implementations, results file may be included in the results set 22 of FIG. 2. Prior to identifying similar pairs, the results file and the inverted index I can be initialized to be empty (step 62). In some implementations, the index I is initialized by the index tool 32 and results file is initialized by the results tool 34.

The dataset V is preliminarily sorted (step 64). In some implementations, the dataset V is preliminarily sorted by the dataset tool 28. In some implementations, the preliminary sort may involve either sorting the dimensions of the dataset V, sorting the vectors in V, or sorting both the dimensions and the vectors in V.

In some implementations, when sorting the dimensions, the dimensions $1, \ldots, m$ (e.g., rows in a vector representation) of V can be ordered monotonically by the number of features that appear among the vectors of the dataset V. In the description below, it is assumed that this order is non-increasing, i.e., when i<j, there are at least as many features among the vectors in V that occur in dimension i as there are occurring in dimension j. In some examples, the order can be non-decreasing.

Figure 6:
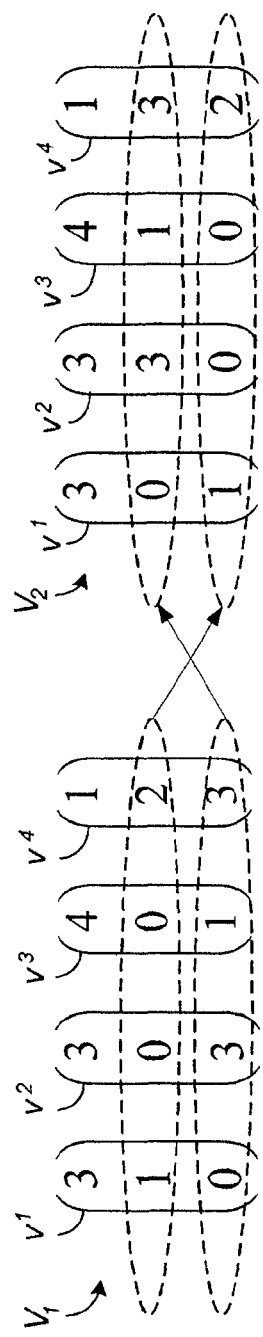
FIG. 6 is an example illustration of ordering dimensions.

FIG. 6 is an example illustration of ordering dimensions of a dataset so that the number of features is non-increasing as the dimension increases. The dataset of FIG. 1B is used as an example. A dataset $V_1$ initially includes vectors (3, 1, 0), (3, 0, 3), (4, 0, 1), and (1, 2, 3). When the dimensions are re-ordered as described above, the dataset $V_1$ becomes a dataset $V_2$, which includes vectors (3, 0, 1), (3, 3, 0), (4, 1, 0), and (1, 3, 2). The dataset $V_2$ has four features (e.g., 3, 3, 4, and 1) that occur in dimension 1, three features (e.g., 3, 1, and 3) that occur in dimension 2, and two features (e.g., 1 and 2) that occur in dimension 3. Thus if n(i) is the function defined as the number of features occurring among the vectors in the dataset V in dimension i, then $n(1) \geq n(2) \geq n(3)$ after ordering the dimensions.

In some implementations, when sorting the vectors, the vectors $v^1, \ldots, v^m$ of V can be ordered monotonically by the maximum weight of the vector. In the description and examples below, it is assumed that the order is non-increasing; i.e., when i<j, maxweight($v^i$) $\geq$ maxweight($v^j$). A non-decreasing order can also be used.

Figure 7:
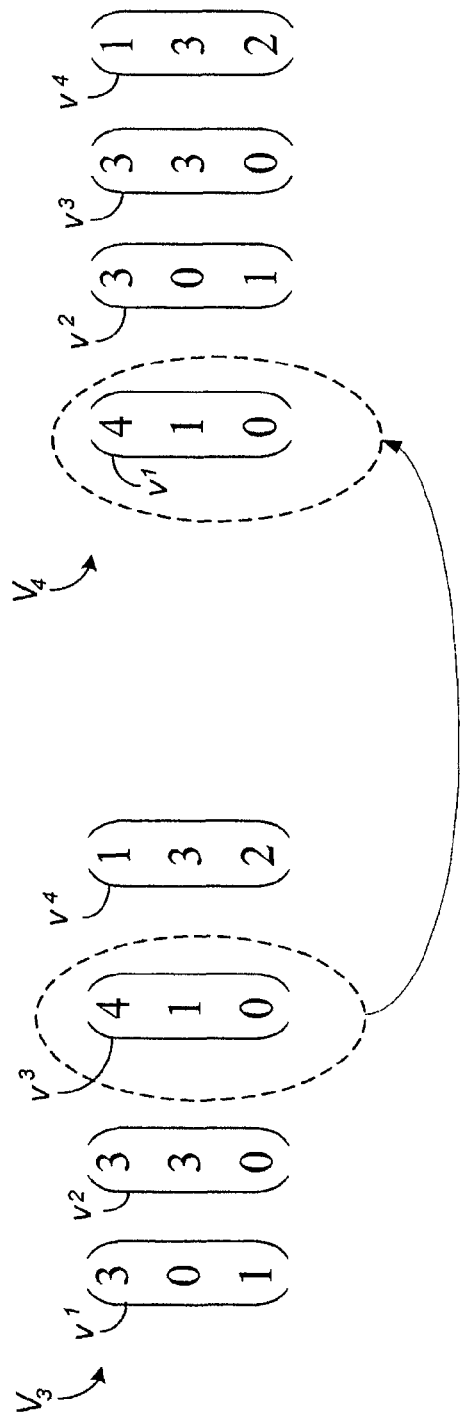
FIG. 7 is an example illustration of ordering vectors.

FIG. 7 is an example illustration of ordering vectors. A dataset $V_3$ is processed so that the vectors in the dataset $V_3$ are sorted in a non-increasing order of the maximum weight function maxweight(•) resulting in a sorted dataset $V_4$. The vector $v^3$ has the largest maximum weight (i.e., 4), so it appears first in the sorted dataset $V_4$. The other vectors each have maximum weight 3, so in some implementations their relative order remains unchanged.

In the case where the dataset V consists entirely of binary vectors (i.e., vectors whose features are all equal to 1), then sorting by maxweight(•) is trivial, since all vectors have weights equal to 1 or 0. In this example case, the dataset V can be sorted by vector size; i.e., |•|, instead of maxweight(•).

Ordering the dimensions of a dataset is useful for locating similar pairs of vectors because ordering the dimensions can reduce the size of the resultant index compared to indices created from datasets whose dimensions are not ordered. Similarly, ordering the vectors in the dataset is useful for locating similar pairs of vectors because ordering the vectors allows for certain estimates (including, but not limited to, step 74, FIG. 8, step 110, FIG. 5) that can avoid unnecessary computation.

In the description below, it is assumed that the dimensions and/or vectors of the dataset V are named consistently with their ordering. Thus, for example, if the dimensions of the dataset V are in a non-increasing order, then the number of features in dimension n is equal to or greater than the number of features in dimension n+1. Similarly, if the vectors of the dataset V are in a non-increasing order, then maxweight($v^1$) $\geq$ maxweight($v^2$).

Referring back to FIG. 5, a comparison vector x is identified in the dataset V (step 66). In some implementations, the comparison vector x is identified by the dataset tool 28. If the vectors are ordered in step 64, then the comparison vector x (and subsequent comparison vectors in subsequent iterations) is identified in an order consistent with the order of the vectors in the dataset. For example, when the vectors in V are sorted in non-increasing order of maxweight(•) the first vector in V is identified first.

In step 68, a partial measure of similarity between x and other vectors of V is accumulated. In some implementations, the similarity is accumulated in a similarity accumulation function A(•) defined on certain vectors (e.g., identified in step 78, FIG. 8) in the dataset V. In some implementations, similarity is accumulated by the similarity tool 30.

Figure 8:
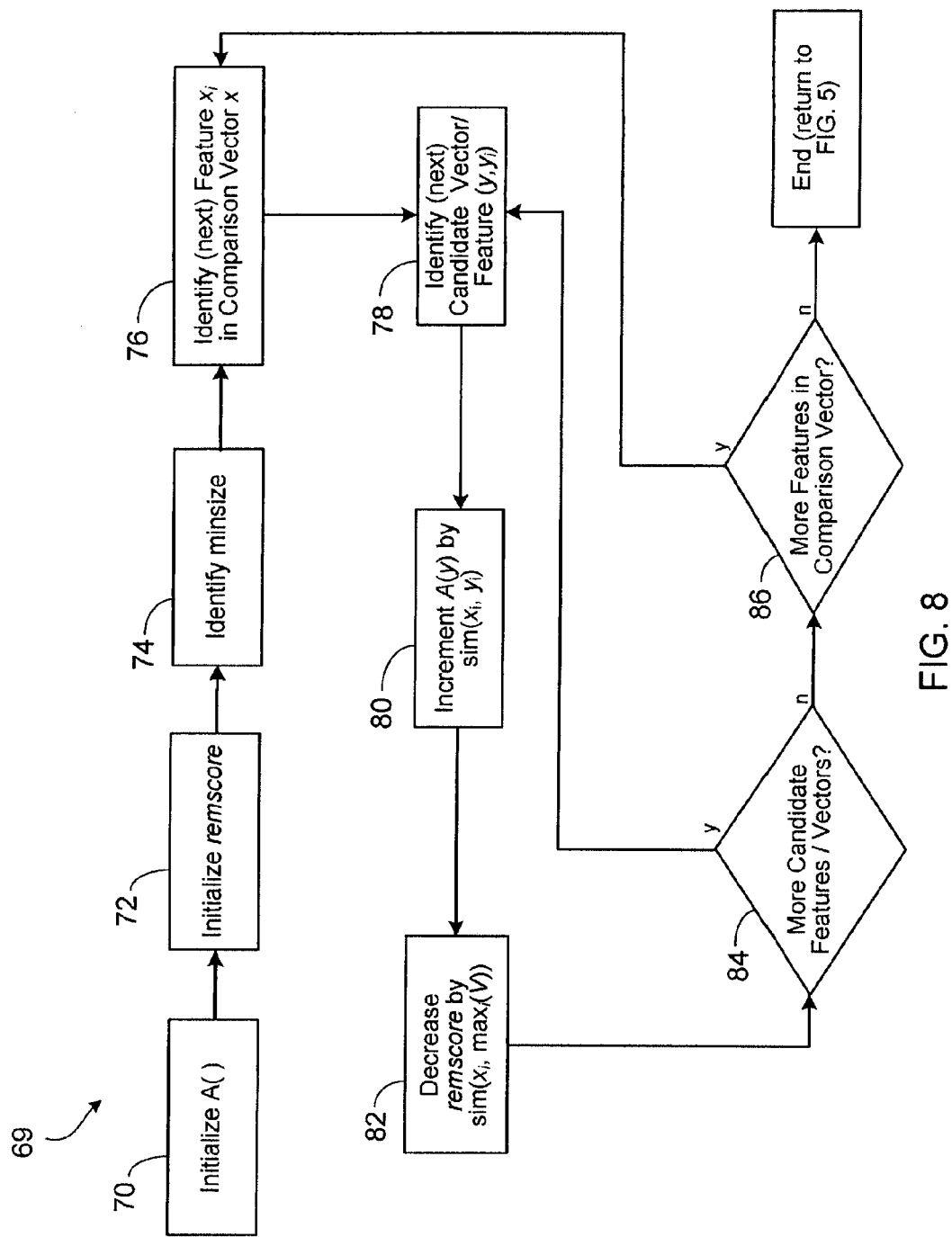
FIG. 8 is a flowchart for an example similarity accumulation algorithm.

FIG. 8 is a flowchart for an example similarity accumulation process 69. In step 70, the accumulation function A(•) is initialized. In some implementations, the initialization includes setting A(y) to be undefined for each vector y in the dataset V. Alternatively, A(y) can be initialized to 0 for each y in V. In some implementations, the similarity tool 30 initializes A(•).

In some implementations, a variable remscore is used to estimate an upper bound of the maximum similarity between the non-processed features of the comparison vector x and the non-processed features of the other vectors in the dataset V. For example, the similarity accumulation process 69 may include iterative steps that perform computations on certain features during each iterative step. For example, each iterative step may involve determining a partial similarity score sim $(x_i, y_i)$ between features $x_i$ and $y_i$ and adding the partial similarity score to the similarity accumulation function A(•). In these examples, a feature $x_i$ is said to be "processed" when the feature $x_i$ has been used to compute a partial similarity score, and a feature $x_j$ is said to be "non-processed" when, for example, the feature $x_j$ has not been used to compute a partial similarity score. In some implementations, contributions of the non-processed features to an overall similarity score can be estimated, reducing the need to process every feature that has not been processed and thereby reducing computation time. This is because if a vector $y_j$ has not been processed and the estimated contribution associated with the vector $y_j$ indicates that the vector's contribution will not meet the similarity threshold, then there is no need to process the vector $y_j$ further.

In some implementations, any estimate of the upper bound of the maximum similarity may be used for determining the value of remscore. Estimates which require a relatively few number of computations are effective in increasing the speed of searching for pairs of similar vectors. For example, in step 72, the value of remscore can be initialized to sim(x, bound (V)). If the similarity function is the dot product of vectors, then $$sim(x, \text{bound}(V)) = \sum_{i=1}^{n} \max_i(V) x_i.$$

In some implementations, the variable remscore is initialized by the similarity tool 30. In the case that the dataset V consists entirely of binary vectors, note that $$\sum_{i=1}^{n} \max_i(V) x_i = |x|.$$

If it is known a priori that the dataset V consists of binary vectors, initializing remscore to |x| (without computing $$\sum_{i=1}^{n} \max_i(V) x_i)$$

can save computational resources.

In some implementations, a variable minsize is used to reduce the number of candidate vectors. The variable minsize is used as an estimate of a lower bound of the minimum size of a candidate vector in order for the candidate vector to be similar to the comparison vector x, for a given similarity threshold and a given similarity function. The variable minsize is identified in step 74. In some implementations, minsize is identified by the similarity tool 30. Any estimate of the lower bound of the minimum size may be used for determining the value of minsize. For example, the variable minsize may be defined by:

minsize=$t$/maxweight($x$), where t is the similarity threshold and x is the comparison vector. Utilizing minsize as described below is effective when the vectors of the dataset are sorted by maxweight(•) for example in step 64 (FIG. 5). If the vectors are not sorted by maxweight(•) a vector y which is actually similar to the comparison vector x may not be identified as a candidate vector in step 78.

If the dataset V consists of binary vectors sorted by size, then in one implementation the variable minsize may be defined by minsize=$|x| \cdot t^2$, and identified in step 74.

In step 76, a feature $x_i$ of the comparison vector x is identified. The feature $x_i$ identified in step 76 is one that has not been previously identified. In some implementations, the feature $x_i$ is identified by the dataset tool 28. For example, if the dimensions of V were ordered (e.g., in step 64 of FIG. 5), then the features $x_i$ may be identified in an order consistent with the order of the dimensions.

A candidate vector is identified in step 78. In some implementations, the candidate vector is identified by the index tool 32. In some implementations, candidate vectors can include any vector y such that the vector-feature pair (y, $y_i$) appears in the index $I_i$. However, this set of possible candidate vectors can be reduced using the estimates described above. For example, if a current value of remscore does not meet the similarity threshold t (i.e., remscore<t), then no candidate vectors y need be identified in step 78. As another example, if the dataset V consists entirely of binary vectors, then no candidate vectors need be identified in step 78 if remscore<minsize. In either case, even if remscore≧t, vectors having a size less than minsize may be excluded from the set of candidate vectors in some implementations.

One way to exclude vectors having a size less than minsize is to examine the size of every vector in the index $I_i$. But if the index $I_i$ is large, this may involve a large amount of computation. On the other hand, if the size of a vector bears a relationship with its maximum weight, then the relationship can be used to find vectors having a size less than minsize. For example, when the vectors in the dataset V are normalized (e.g., in the Euclidean norm) so that their lengths are equal (e.g., equal to 1), then vector size tends to be inversely proportional to a vector's maximum weight. Thus, if the dataset is sorted in a non-increasing order of maxweight(•) then vectors with a small size tend to appear in the front of the index $I_i$. In such implementations, one may identify candidate vectors by removing vectors y from the front of the index $I_i$ until the first vector in $I_i$ has a size greater than minsize. By doing so, although some vectors with size less than minsize may be identified as candidate vectors, for some datasets the extra computation involved in locating these candidate vectors is more than the extra computation of including them as candidate vectors.

In step 80, the accumulation function A(y) is increased by an amount equal to sim($x_i$, $y_i$). Since the similarity of the feature $x_i$ is now accounted for in A(y), the variable remscore is decreased so that it remains an estimate of the non-processed features. In step 82, the variable remscore is decreased by an amount equal to sim($x_i$, max$_i$(V)). Thus, after step 80 the accumulation function A reflects the similarity between the vectors x and y for the first i coordinates (if being identified in order). Thus, the upper bound remscore is decreased by the corresponding estimate for the similarity between the vectors x and y in the ith dimension. After step 82, the value of the variable remscore represents an upper bound on the similarity between the coordinates i+1, . . . , n of the vectors x and y. In some implementations, the accumulation function A is increased and remscore is decreased by the similarity tool 30. Note that if the dataset V consists entirely of binary vectors, then sim($x_i$, max$_i$(V))=1. Thus, in steps 80 and 82, the accumulation function A and remscore can be increased and decreased, respectively, by 1, without computing sim($x_i$, max$_i$(V)).

If there are more candidate vectors or features not already identified in step 78 (decision 84), then steps 78 to 82 are repeated using these vectors or features. After steps 78 to 84 have been performed for each candidate vector or feature, if there are more features of the comparison vector x that have not yet been identified in step 76 (decision 86), then steps 76 to 84 are repeated to process these features. After iterating the loop 78 to 86 over all the features of the comparison vector x, the value of the accumulation function A(•) represents an accumulation of the similarity scores between the comparison vector x and all the candidate vectors.

Referring back to FIG. 5, vectors similar to the comparison vector x are identified in step 88. In some implementations, the vectors similar to the comparison vector x are identified by the similarity tool 30.

Figure 9:
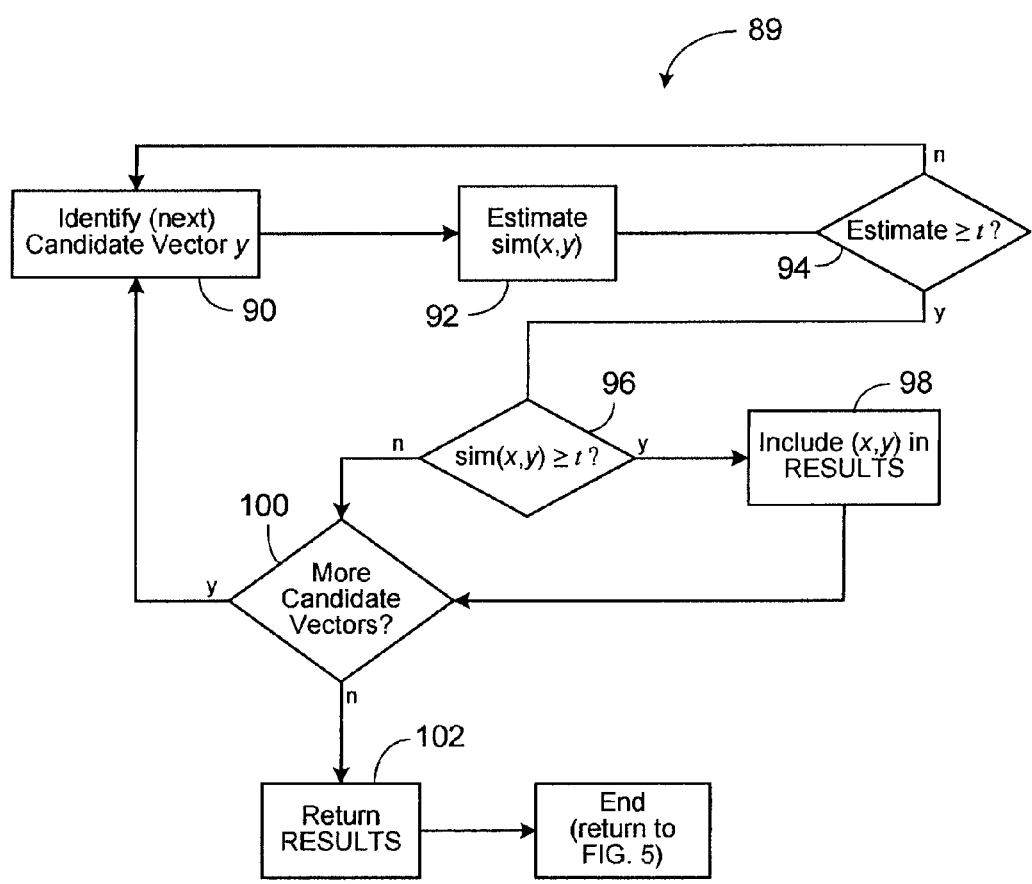
FIG. 9 is an example algorithm for finding pairs of vectors similar to a given vector.

FIG. 9 is an example process 89 for finding pairs of vectors, each pair including a vector x and another vector similar to the vector x. In step 90 a candidate vector y is identified. For example, the candidate vector y can be identified from a pool of candidate vectors as described above. In some implementations, the candidate vector is identified by the index tool 32.

An estimate E of the similarity sim(x, y) is identified in step 92. In some implementations, the estimate E is determined by the similarity tool 30. The estimate E can be determined using any estimate of the similarity score sim(x, y) such that E≧sim(x, y). In some implementations, the estimate E requires fewer computations to identify than it does to compute sim(x, y). Thus, one may use the estimate E to exclude the possibility that the comparison x is similar to the candidate vector y without having to resort to computing sim(x, y).

In some examples, the estimate E can be determined by:

$$E = A(y) + \min(|x|, |y'|) \cdot \text{sim}(\text{maxweight}(x), \text{maxweight}(y)), \quad (1)$$

where y' denotes the unindexed portion of the candidate vector y. For example, when the dot product is used as the similarity function, then equation (1) above becomes $$E = A(y) + \min(|x|, |y'|) \cdot \text{maxweight}(x) \cdot \text{maxweight}(y), \quad (2)$$

where y' denotes the non-indexed portion of y.

If the estimate E does not meet the similarity threshold (decision 94), e.g., E<t, then the candidate vector y is not a match, and the next candidate vector may be identified. On the other hand, if E≧t, then y may be (but need not be) similar to x. In some implementations, to determine whether y is similar to x, the full similarity score sim(x, y) is used.

If sim(x, y)≧t (decision 96), then y is similar to x, and the pair (x, y) is included in results file (step 98). In some implementations, the pair (x, y) is included in results file by the results tool 34. After including (x, y) in results file (or if sim(x, y)<t in decision 96), if there are more candidate vectors which have not yet been identified in step 90, then steps 90 to 100 are repeated to process these candidate vectors. Otherwise, results file includes all the vectors y similar to the comparison vector x.

Referring back to FIG. 5, having identified vectors similar to the comparison vector x and recorded them (step 104), whether to index any features of x is determined. In some implementations, an upper bound b will be used in indexing the comparison vector x. The upper bound b measures the estimated maximum contribution from the comparison vector x to the similarity score accumulation, discussed below.

The upper bound b is initialized to 0 (step 106) and a dimension i corresponding to a feature $x_i$ of x is identified (step 108). In some implementations, the upper bound b is initialized by the similarity tool 30. The upper bound b is incremented by an estimated similarity contribution (step 110), a quantity that represents the maximum similarity contribution from the feature $x_i$ to the similarity between x and other vectors in the dataset V. For example, the estimated similarity contribution can be determined by sim($\max_i(V)$, $x_i$). If the dataset was ordered by maxweight(•), then a second estimate is given by sim(maxweight(x), $x_i$). In some implementations both estimates are computed, and the smaller of the two may be used. In the case that the dataset V consists of binary vectors, the similarity contribution is equal to 1, which may be used instead of one of the estimates described above. In some implementations, the estimated similarity contribution is determined by the similarity tool 30.

Regardless of the estimate of the maximum similarity contribution due to $x_i$ used above, the value of b after step 110 represents an estimated upper bound of the similarity between the features identified step 108 (including previous iterations of step 108), and any other vector in the dataset V.

If the upper bound b is greater than or equal to the similarity threshold (i.e., b≧t) (decision 112), then the feature $x_i$ is indexed (step 114). Alternatively, if the dataset V consists entirely of binary vectors, then the inequality b≧t·|x| is tested in the decision 112. In some implementations, the feature $x_i$ is written to the index by the index tool 32. After being indexed in step 114, the feature $x_i$ may be removed from the comparison vector x (step 116). For example, if the dataset V is stored in a medium with less capacity than the index I (e.g., the dataset V is stored in memory and the index I is stored on a hard disk), then removing features as they are indexed can save space on the medium storing the dataset V. In some implementations, the dataset tool 28 removes the feature $x_i$ from the dataset V.

Indexing features $x_i$ in step 114 only after b is greater or equal to the similarity threshold allows the process 59 to maintain a relatively small index, yet index enough features of each vector to ensure that, for a given vector, any similar vector is actually identified as a candidate vector during step 88.

In the description below, the non-indexed portion of a vector x is denoted x', and the indexed portion of x is denoted x". In some implementations, removing a feature $x_i$ after indexing in step 114 may be accomplished by setting the i-th coordinate equal to 0 in x', and setting the i-the coordinate equal to $x_i$ in x". Thus, x=x'+x". Note that, if sim(•, •) is linear, then sim(x, y)=sim(x', y)+sim(x", y). Even if sim(•, •) is not linear, often sim(x, y) bears a relationship with sim(x', y)+sim(x", y) such that the estimates described here can be used to accurately identify similar pairs of vectors.

If the upper bound b is less than the similarity threshold (i.e., b<t) in decision 112, or after removing $x_i$ in step 116, it is determined whether there are more features of the comparison vector x that have not yet been identified (decision 118). If there are more features of x that have not yet been identified, steps or decisions 66, 68, 88, and 104 to 116 are repeated to process these features. In some implementations, the dimensions are identified in subsequent iterations of step 66 in an order consistent with the order employed in the preliminary sort of step 64. For example, if the number of features among the vectors in the dataset V that occur in dimension i (denoted n(i)) is a non-increasing function of i, then the smallest dimension corresponding to a feature of the comparison vector x may be identified in step 66. Conversely, if n(i) is a non-decreasing function of i, then the largest dimension corresponding to a feature of the comparison vector x may be identified in step 66.

Once all the identified vector's features have been considered in steps or decisions 66, 68, 88, and 104 to 116, if there are any vectors in the dataset V that have not yet been identified (decision 120), then steps or decisions 66, 68, 88, and 104 to 116 are repeated for these vectors. After repeating steps or decisions 66, 68, 88, and 104 to 116 for each vector in the dataset V, the results file contains all pairs of vectors (x, y) in the dataset V such that sim(x, y)≧t. The contents of results file may be partially or completely displayed by the search system 10 (step 124).

The above steps or decisions may be performed in any logically possible order. In practical implementations, performing the steps in certain orders may involve ancillary data processing. For example, in some implementations, the dataset V and the results set or results file may be stored on an optical or magnetic disk in a computer, while a portion of the dataset V, the index I and the similarity accumulation function A are stored in a memory of the computer. If the dataset V is large enough such that the entire inverted index I or similarity accumulation function A cannot be kept in the memory of the computer, then portions of I or A can be moved back and forth between memory and another storage medium, e.g., the optical or magnetic disk. However, such ancillary data processing may slow down the performance of the search process.

To reduce such ancillary data processing steps, one strategy is to build the index (e.g., iterate through steps 66 to 120) until indexing (e.g., steps 106 to 118) would exceed available memory, or come within a pre-defined threshold of exceeding available memory. At such a time, the search process can switch to a "matching only" phase. For example, in a matching-only phase, the decision 120 would follow step 104, without any intervening steps.

In some implementations, the matching-only phase persists until the dataset V has been examined for matches. When this occurs, the index I is cleared, and indexing is resumed, starting from the point at which indexing was previously suspended. For some datasets, the index I may be cleared during the course of the matching-only phase. For example, if the dataset is ordered by maxweight(•) and all the vectors currently in the index have a size below minsize, then they may all be removed. In some implementations, if the index I is cleared prior to examining the contents of V during the match-only phase, indexing is resumed from the point at which it was previously suspended.

The following table (Table 1) illustrates results at different timesteps when applying the process 59 of FIG. 5 to the example dataset of FIG. 1A for a similarity threshold t=14, and a similarity function given by the vector dot product.

In this example, the dimensions of dataset V of FIG. 1A are such that the number of features in a dimension i varies monotonically as a function of i, but the vectors are not sorted in order of maxweight(•). Thus, applying the process 59 to the dataset V does not involve estimates or techniques that depend on a vector order. Moreover, the variable remscore is not used in identifying candidate vectors.

TABLE 1

| Time-step | Comparison Vector | A | b | Index | Similar Pairs (results file) |
|---|---|---|---|---|---|
| 0 | none | undefined | undefined | empty | empty |
| 1 | $x = v^1$ | undefined | 12 | empty | empty |
| 2 | $x = v^1$ | undefined | 14 | $I_3 = \{(v^1, 3)\}$ | empty |
| 3 | $x = v^2$ | undefined | 21 | $I_2 = \{(v^2, 3)\}$, $I_3 = \{(v^1, 3)\}$ | empty |
| 4 | $x = v^3$ | $A(v^2) = 3$ | 21 | $I_2 = \{(v^2, 3)\}$, $I_3 = \{(v^1, 3)\}$ | $\{(v^3, v^2)\}$ |
| 5 | $x = v^3$ | $A(v^2) = 3$ | 19 | $I_1 = \{(v^3, 4)\}$, $I_2 = \{(v^2, 3), (v^3, 1)\}$, $I_3 = \{(v^1, 3)\}$ | $\{(v^3, v^2)\}$ |
| 6 | $x = v^4$ | $A(v^1) = 2$ $A(v^2) = 12$ $A(v^3) = 7$ | 19 | $I_1 = \{(v^3, 4)\}$, $I_2 = \{(v^2, 3), (v^3, 1)\}$, $I_3 = \{(v^1, 3)\}$ | $\{(v^3, v^2)\}$ |
| 7 | $x = v^4$ | $A(v^1) = 2$ $A(v^2) = 12$ $A(v^3) = 7$ | 17 | $I_1 = \{(v^3, 4)\}$, $I_2 = \{(v^2, 3), (v^3, 1)\}$, $I_3 = \{(v^1, 3), (v^4, 2)\}$ | $\{(v^3, v^2)\}$ |

Timestep 0 illustrates the state of the accumulation A(•) function, the upper bound b, the inverted index I, and the results file at step 60 in FIG. 5, before the first iteration of the loop 66, 68, 88, 104 to 120. At timestep 0, A(•), b, I, and the results file are initialized.

The vector $v^1$ is identified as the comparison vector x in step 66 (FIG. 5). In this example, steps 72 and 74 (FIG. 8) are not carried out, since remscore or minsize will not be used in this example. In step 76, the feature $x_i=3$ is identified. In this example, all vectors in the inverted index I are identified as candidate vectors. Since the index I is empty so far, no vector is identified in step 78, and A(•) is unchanged in step 80.

In decision 84, there are no more candidate vectors. In decision 48, there are other features in the comparison vector x, namely $x_3=1$. However, since the index I is currently empty, the loop 78 to 84 bears identical results to the $x_1$ iteration.

Next, similar vectors to $v^1$ are sought in step 88 (FIG. 5). Referring to FIG. 9, since no candidate vectors were identified, loop 90 to 102 bears no results. Proceeding to step 106 in FIG. 5, b is initialized to 0.

In step 108, suppose dimension i=1 is identified. For purposes of this example, the similarity contribution estimate in step 110 is equal to $sim(max_i(V), x_i)$. Thus, $max_1(V)=4$, $x_1=3$, and $sim(4,3)=4\cdot3=12$. Since the similarity threshold t=14 is assumed, then decision 112 results in a negative. Thus, $x_1$ is not indexed. The current state is shown in the Table 1 above at timestep 1.

The next dimension in which x has a feature is dimension i=3, with the feature $x_3=1$. Thus, b is further incremented by $max_3(V) \cdot x_3 = 2 \cdot 1 = 2$, to obtain a value of b=14. Decision 112 results in an affirmative result, so $x_3$ is indexed in step 114. The current state of the procedure is shown in the Table 1 above at timestep 2.

There are no more features of $x=v^1$, but there are other vectors ($v^2$, $v^3$, $v^4$) in V. Thus, the loop 66, 68, 88, 104 to 120 is reiterated using a new comparison vector. Suppose the new comparison vector is $x=v^2$.

Referring to FIG. 8, the comparison vector x has features in dimensions 1 and 2. However, the index only includes features from dimension 3, namely ($v^1$, 1). Therefore, there are no candidate vectors to identify in step 78, the value of A(•) remains unchanged through each iteration of the loop 76 to 84, and there no results to return in step 100 of FIG. 9.

Referring back to FIG. 5, b is initialized to 0, and $x_1=3$ is identified in steps 106 and 108, respectively. In step 110, b is incremented by $sim(x_1, max_1(V))=3\cdot4=12$. Since 12<t=14, the feature $x_1$ is not indexed. Thereafter, $x_2=3$ is identified in step 108, and b is incremented by $sim(x_1, max_1(V))=3\cdot3=9$. Thus, b=21>t, so $x_2$ is indexed in step 114. There are no more features of x. This state is shown in timestep 3.

There are other vectors in V, namely $v^3$ and $v^4$. Suppose $x=v^3$ is identified as the next comparison vector in step 66, and $x_1=4$ is identified as the feature in step 76 (FIG. 8). Again, since there are no features from the first dimension of V indexed, the loop 76 to 84 produces no results from $x_1$.

In a second iteration of the loop 76 to 84, $x_2$ is identified. Now, in step 78, there is a vector indexed in $I_2$, namely $y=v^2$ having the feature $y_2=3$. Thus, $v^2$ is identified as a candidate vector in step 78, and $A(v^2)$ is incremented by $sim(x_2, y_2)=1\cdot3=3$ in step 80. There are no more vectors in $I_2$, or features of x left to reiterate the loop 76 to 86.

Referring to FIG. 9, in step 90, there is one candidate vector $y=v^2$. For the purposes of this example, the estimate of similarity in steps 92 to 94 is not utilized, and a direct similarity computation is performed. In decision 96, since $sim(x,y)=sim(v^3, v^2)=4\cdot3+1\cdot3+0\cdot0=15>t$, the pair $(v^3, v^2)$ is included in results file in step 98. This state is shown in timestep 4.

Referring back to FIG. 5, b is initialized to 0 in step 106, and incremented by $sim(max_1(V), x_1)=4\cdot4=16$. Since b exceeds the similarity threshold, $x_1$ is indexed. In a subsequent iteration, b is increased by $sim(max_2(V), x_2)=1\cdot3$, to a total value of b=19. Thus, $x_2$ is indexed as well. This state is shown in timestep 5.

The last vector, $x=v^4$, is identified in step 66. Referring to FIG. 8, the feature $x_1=1$ is identified in step 76, and the loop 78 to 84 produces a new value for $A(v^3)=4$. In the next iteration of loop 76 to 86 with $x_2=3$ having been identified in step 76, the value of $A(v^2)$ is incremented by $3\cdot3=9$ resulting in a new value of $A(v^2)=3+9=12$. The value of $A(v^3)$ is incremented by $3\cdot1$, for a new value $A(v^3)=7$. In the final iteration of loop 76 to 84, with $x_3=2$ having been identified in step 76, the value of $A(v^1)$ is defined as $A(v^1)=1\cdot2=2$. This state is shown in timestep 6.

In step 90 (FIG. 9), the candidate vectors include $v^1$, $v^2$, and $v^3$. For the candidate vector $y=v^1$, $sim(x,y)=1\cdot3+3\cdot0+2\cdot1=5<t$. For the candidate vector $y=v^2$, $sim(x,y)=1\cdot3+3\cdot3+2\cdot0=12<t$. For the candidate vector $y=v^3$, $sim(x,y)=1\cdot4+3\cdot1+2\cdot0=13<t$. Thus, there are no additional results identified in the loop 90 to 102 for any of the candidate vectors.

Referring back to FIG. 5, b is initialized to 0, and the feature $x_1=1$ is identified in steps 106 and 108, respectively. In step 110, b is incremented by $sim(max_1(V), x_1)=1\cdot4=4<t$. Therefore, $x_i$ is not indexed. In a second iteration, b is further incremented by $sim(max_2(V)), x_2)=3\cdot3=9$, for a value b=13<t. Therefore, $x_2$ is not indexed. Finally, in a third iteration, b is further incremented by $sim(max_3(V)), x_3)=2\cdot2=4$, for a value b=17>t. Therefore, $x_3$ is indexed in step 114. This state is shown in timestep 7. There are no more features of x, and there are no more vectors in V which have not been considered.

This example is for purposes of illustration only; the particular order of the steps performed, or the choices of vectors or features at a given step, is not meant to limit the scope of the techniques described in this document.

Figure 10:
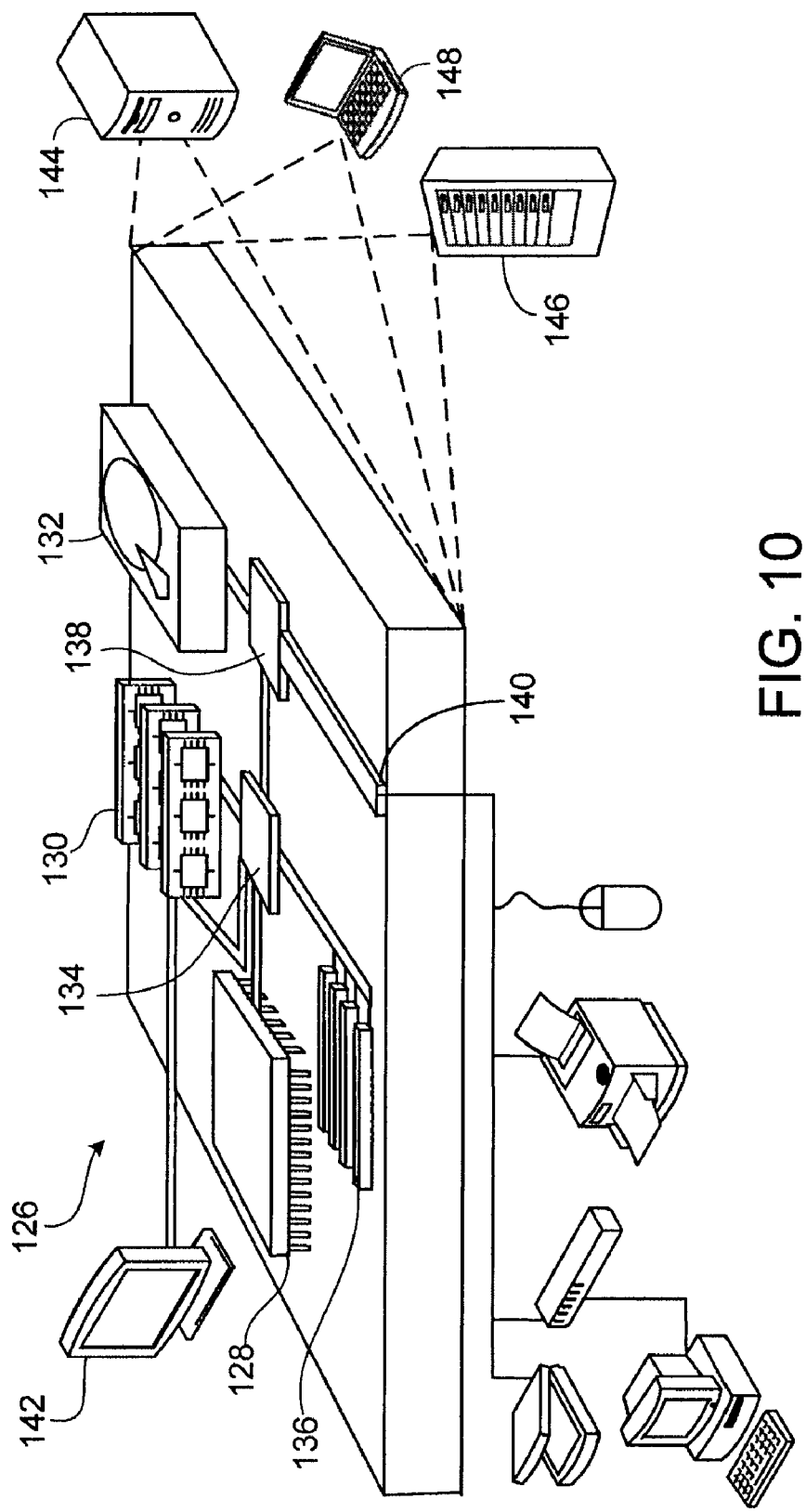
FIG. 10 is a block diagram of a computing device that may be used to implement the search system, as either a client or as a server or plurality of servers.

FIG. 10 is a block diagram of a example device (e.g., computing device 126) that may be used to implement the search system 10, as either a client or as a server or plurality of servers. Computing device 126 is intended to represent various forms of digital computers, such as laptops, desktops, workstations, personal digital assistants, servers, blade servers, mainframes, and other appropriate computers. While in this example reference is made to computing devices, the techniques and processes discussed can be implemented in whole or part on other types of electronic devices. The components shown here, their connections and relationships, and their functions, are meant to be exemplary only, and are not meant to limit implementations of the inventions described and/or claimed in this document.

Computing device 126 includes a processor 128, memory 130, a storage device 132, a high-speed interface 134 connecting to memory 130 and high-speed expansion ports 136, and a low-speed interface 138 connecting to low-speed bus 140 and storage device 132. Each of the components 128, 130, 132, 134, 136, and 138, are interconnected using various busses, and may be mounted on a common motherboard or in other manners as appropriate. The processor 128 can process instructions for execution within the computing device 126, including but not limited to instructions stored in the memory 130 or on the storage device 132 to display graphical information for a GUI on an external input/output device, such as display 142 coupled to high-speed interface 134. In other implementations, multiple processors and/or multiple buses may be used, as appropriate, along with multiple memories and types of memory. Also, multiple computing devices 126 may be connected, with each device providing portions of the necessary operations (e.g., as a server bank, a group of blade servers, or a multi-processor system).

The memory 130 stores information within the computing device 126. In one implementation, the memory 130 is a computer-readable medium. In one implementation, the memory 130 is a volatile memory unit or units. In another implementation, the memory 130 is a non-volatile memory unit or units.

The storage device 132 is capable of providing mass storage for the computing device 126. In one implementation, the storage device 132 is a computer-readable medium. In various different implementations, the storage device 132 may be a floppy disk device, a hard disk device, an optical disk device, or a tape device, a flash memory or other similar solid state memory device, or an array of devices, including but not limited to devices in a storage area network or other configurations. In one implementation, a computer program product is tangibly embodied in an information carrier. The computer program product contains instructions that, when executed, perform one or more methods, such as those described above. The information carrier is a computer- or machine-readable medium, such as the memory 130, the storage device 132, memory on processor 128, or a propagated signal.

The high-speed interface 134 manages bandwidth-intensive operations for the computing device 126, while the low-speed interface 138 manages lower bandwidth-intensive operations. Such allocation of duties is exemplary only. In one implementation, the high-speed interface 134 is coupled to memory 130, display 142 (e.g., through a graphics processor or accelerator), and to high-speed expansion ports 136, which may accept various expansion cards (not shown). In the implementation, low-speed interface 138 is coupled to storage device 132 and low-speed bus 140. The low-speed expansion port, which may include various communication ports (e.g., USB, Bluetooth, Ethernet, wireless Ethernet) may be coupled to one or more input/output devices, such as a keyboard, a pointing device, a scanner, or a networking device such as a switch or router, e.g., through a network adapter.

The computing device 126 may be implemented in a number of different forms, as shown in the figure. For example, it may be implemented as a standard server 130, or multiple times in a group of such servers. It may also be implemented as part of a rack server system 146. In addition, it may be implemented in a personal computer such as a laptop computer 148.

Various implementations of the search system 10 can be realized in digital electronic circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including but not limited to at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and can be implemented in a high-level procedural and/or object-oriented programming language, and/or in assembly/machine language. As used herein, the terms "machine-readable medium" "computer-readable medium" refers to any computer program product, apparatus and/or device (e.g., magnetic discs, optical disks, memory, Programmable Logic Devices (PLDs)) used to provide machine instructions and/or data to a programmable processor, including but not limited to a machine-readable medium that receives machine instructions as a machine-readable signal. The term "machine-readable signal" refers to any signal used to provide machine instructions and/or data to a programmable processor.

To provide for interaction with a user, the search system 10 can be implemented on a computer having a display device (e.g., a CRT (cathode ray tube) or LCD (liquid crystal display) monitor) for displaying information to the user and a keyboard and a pointing device (e.g., a mouse or a trackball) by which the user can provide input to the computer. Other kinds of devices can be used to provide for interaction with a user as well; for example, feedback provided to the user can be any form of sensory feedback (e.g., visual feedback, auditory feedback, or tactile feedback); and input from the user can be received in any form, including but not limited to acoustic, speech, or tactile input.

The search system 10 can be implemented in a computing system that includes a back end component (e.g., as a data server), or that includes a middleware component (e.g., an application server), or that includes a front end component (e.g., a client computer having a graphical user interface or a Web browser through which a user can interact with an implementation of the search system 10), or any combination of such back end, middleware, or front end components. The components of the system can be interconnected by any form or medium of digital data communication (e.g., a communication network). Examples of communication networks include a local area network ("LAN"), a wide area network ("WAN"), and the Internet.

The computing system can include clients and servers. A client and server are generally remote from each other and typically interact through a communication network. The relationship of client and server arises by virtue of computer programs running on the respective computers and having a client-server relationship to each other.

Other embodiments are within the scope of the following claims. For example, the dataset V can be used to represent several types of groups of objects. For example, V can be an m×n array that can be partitioned into n vectors (e.g., the columns of the array), with each vector having m dimensions. For example, V can be a collection of functions $f_i$ (i=1 to n) defined on a set $\{1, \ldots, m\}$, in which each function $f_i(k)$ can be represented as a vector with the k-th component of the vector given by $f_i(k)$. The user 12 in FIG. 1 can be, e.g., a human user or a non-human user, such as a computer program.

What is claimed is:

1. A computer-implemented method for identifying users colluding with a user represented by vector x in a first plurality of vectors, wherein each of the vectors represents a corresponding user, wherein each feature of each vector represents the corresponding user's click-behavior with regard to a content item, the method comprising:
   for each of a second plurality of vectors y, wherein each vector y is a vector in the first plurality of vectors, and each vector y includes at least one feature indexed in an index:
      computing, using one or more computers, a similarity estimate between the vector x and the vector y using features of vector x and only the indexed features of vector y;
      if and only if the similarity estimate satisfies a similarity threshold, computing a similarity score for the pair of vectors (x, y), wherein the similarity score for the pair of vectors (x, y) is a measure of similarity between the vector x and the vector y;
      if the similarity score satisfies the similarity threshold, including the pair of vectors (x, y) in a set of similar pairs of vectors; and
   identifying users corresponding to vectors in the set of similar pairs of vectors as users colluding with the user represented by vector x.

2. The method of claim 1, further comprising:
   determining a size threshold minsize, wherein minsize is a function of the vector x and the similarity threshold; and
   for each feature of the vector x, removing a corresponding indexed feature of vector y from the corresponding index if a size of the vector y is not at least equal to the size threshold.

3. The method of claim 1, wherein computing a similarity estimate between the vector x and the vector y using features of vector x and indexed features of vector y comprises:
   determining, using one or more computers, a partial similarity score between the vector x and the vector y, the partial similarity score representing a degree of similarity between features of the vector x and corresponding features of vector y; and
   computing the similarity estimate based at least in part on the partial similarity score between the vector x and the vector y.

4. The method of claim 3, wherein the partial similarity score is based on a computed similarity score between a subset of indexed features of the vector y and corresponding features of the vector x.

5. The method of claim 4, wherein the similarity estimate is based
   a sum of the partial similarity score and a product of
      (i) a minimum size of at least one of the vector x or a set of non-processed features of the vector y, wherein non-processed features of the vector y are features that have not been used to compute the partial similarity score,
      (ii) a maximum weight of the vector x, and
      (iii) a maximum weight of the vector y.

6. The method of claim 1, wherein the similarity estimate between the vector x and any vector y is greater than or equal to the similarity score between the vector x and the vector y.

7. The method of claim 1, wherein the content item is a markup language document.

8. A system for identifying users colluding with a user represented by vector x in a first plurality of vectors, wherein each of the vectors represents a corresponding user, wherein each feature of each vector represents the corresponding user's click-behavior with regard to a content item, the system comprising:
one or more computers; and
a computer-readable storage device having stored thereon instructions that, when executed by the one or more computers, cause the one or more computers to perform operations comprising
for each of a second plurality of vectors y, wherein each vector y is a vector in the first plurality of vectors, and each vector y includes at least one feature indexed in an index:
computing, using one or more computers, a similarity estimate between the vector x and the vector y using features of vector x and only the indexed features of vector y;
if and only if the similarity estimate satisfies a similarity threshold, computing a similarity score for the pair of vectors (x, y), wherein the similarity score for the pair of vectors (x, y) is a measure of similarity between the vector x and the vector y;
if the similarity score satisfies the similarity threshold, including the pair of vectors (x, y) in a set of similar pairs of vectors; and
identifying users corresponding to vectors in the set of similar pairs of vectors as users colluding with the user represented by vector x.

9. The system of claim 8, wherein the operations further comprise:
determining a size threshold minsize, wherein minsize is a function of the vector x and the similarity threshold; and
for each feature of the vector x, removing a corresponding indexed feature of vector y from the corresponding index if a size of the vector y is not at least equal to the size threshold.

10. The system of claim 8, wherein computing a similarity estimate between the vector x and the vector y using features of vector x and indexed features of vector y comprises:
determining, using one or more computers, a partial similarity score between the vector x and the vector y, the partial similarity score representing a degree of similarity between features of the vector x and corresponding features of vector y; and
computing the similarity estimate based at least in part on the partial similarity score between the vector x and the vector y.

11. The system of claim 10, wherein the partial similarity score is based on a computed similarity score between a subset of indexed features of the vector y and corresponding features of the vector x.

12. The system of claim 11, wherein the similarity estimate is based
a sum of the partial similarity score and a product of
(i) a minimum size of at least one of the vector x or a set of non-processed features of the vector y, wherein non-processed features of the vector y are features that have not been used to compute the partial similarity score,
(ii) a maximum weight of the vector x, and
(iii) a maximum weight of the vector y.

13. The system of claim 8, wherein the similarity estimate between the vector x and any vector y is greater than or equal to the similarity score between the vector x and the vector y.

14. The system of claim 8, wherein the content item is a markup language document.

15. A computer-readable storage device having stored thereon instructions for identifying users colluding with a user represented by vector x in a first plurality of vectors, wherein each of the vectors represents a corresponding user, wherein each feature of each vector represents the corresponding user's click-behavior with regard to a content item, wherein the instructions, when executed by a computer, cause the computer to perform operations comprising:
for each of a second plurality of vectors y, wherein each vector y is a vector in the first plurality of vectors, and each vector y includes at least one feature indexed in an index:
computing, using one or more computers, a similarity estimate between the vector x and the vector y using features of vector x and only the indexed features of vector y;
if and only if the similarity estimate satisfies a similarity threshold, computing a similarity score for the pair of vectors (x, y), wherein the similarity score for the pair of vectors (x, y) is a measure of similarity between the vector x and the vector y;
if the similarity score satisfies the similarity threshold, including the pair of vectors (x, y) in a set of similar pairs of vectors; and
identifying users corresponding to vectors in the set of similar pairs of vectors as users colluding with the user represented by vector x.

16. The storage device of claim 15, wherein the operations further comprise:
determining a size threshold minsize, wherein minsize is a function of the vector x and the similarity threshold; and
for each feature of the vector x, removing a corresponding indexed feature of vector y from the corresponding index if a size of the vector y is not at least equal to the size threshold.

17. The storage device of claim 15, wherein computing a similarity estimate between the vector x and the vector y using features of vector x and indexed features of vector y comprises:
determining, using one or more computers, a partial similarity score between the vector x and the vector y, the partial similarity score representing a degree of similarity between features of the vector x and corresponding features of vector y; and
computing the similarity estimate based at least in part on the partial similarity score between the vector x and the vector y.

18. The storage device of claim 17, wherein the partial similarity score is based on a computed similarity score between a subset of indexed features of the vector y and corresponding features of the vector x.

19. The storage device of claim 18, wherein the similarity estimate is based
a sum of the partial similarity score and a product of
(i) a minimum size of at least one of the vector x or a set of non-processed features of the vector y, wherein non-processed features of the vector y are features that have not been used to compute the partial similarity score,
(ii) a maximum weight of the vector x, and
(iii) a maximum weight of the vector y.

20. The storage device of claim 15, wherein the similarity estimate between the vector x and any vector y is greater than or equal to the similarity score between the vector x and the vector y.

21. The storage device of claim 15, wherein the content item is a markup language document.

* * * * *